(12) United States Patent
Zhang et al.

(10) Patent No.: US 11,374,840 B1
(45) Date of Patent: Jun. 28, 2022

(54) NETWORK ENVIRONMENT-BASED DYNAMIC APPLICATION RECOMMENDATION

(71) Applicant: Citrix Systems, Inc., Fort Lauderdale, FL (US)

(72) Inventors: Xiao Zhang, Nanjing (CN); Ke Xu, Nanjing (CN); Zongpeng Qiao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/224,422

(22) Filed: Apr. 7, 2021

Related U.S. Application Data

(63) Continuation of application No. PCT/CN2020/138665, filed on Dec. 23, 2020.

(51) Int. Cl.
| | |
|---|---|
| *G06F 15/173* | (2006.01) |
| *H04L 43/0894* | (2022.01) |
| *H04L 41/0686* | (2022.01) |
| *H04L 67/30* | (2022.01) |
| *H04L 67/50* | (2022.01) |

(52) U.S. Cl.
CPC ...... *H04L 43/0894* (2013.01); *H04L 41/0686* (2013.01); *H04L 67/22* (2013.01); *H04L 67/30* (2013.01)

(58) Field of Classification Search
CPC . H04L 67/22; H04L 41/0896; H04L 43/0894; H04L 41/0686; H04L 67/30; G06F 1/3287

USPC .......................................................... 709/224
See application file for complete search history.

(56) References Cited

U.S. PATENT DOCUMENTS

| | | | |
|---|---|---|---|
| 7,769,882 B1* | 8/2010 | Wong | H04L 43/0882 709/232 |
| 8,935,393 B1* | 1/2015 | Jackson | H04L 67/22 709/224 |
| 9,544,195 B1* | 1/2017 | Garg | H04L 47/627 |
| 2011/0208801 A1* | 8/2011 | Thorkelsson | H04L 67/2814 709/203 |

(Continued)

OTHER PUBLICATIONS

H. Li, X. Lu, Mining device-specific apps usage patterns from large-scale android users, p. 1-30, IEEE Transaction of Software Engineering, vol. XX No. X (Year: 2017).*

(Continued)

*Primary Examiner* — Taylor A Elfervig
(74) *Attorney, Agent, or Firm* — Banner & Witcoff, Ltd.

(57) ABSTRACT

Methods and systems for providing secure file sharing are described herein. A computing device may determine a maximum available bandwidth for a user device. The computing device may determine, based on a network bandwidth associated with one or more applications running on the user device, a currently available bandwidth for the user device. The computing device may determine an estimated network bandwidth associated with one or more applications available to be launched via the user device. The computing device may then determine a notification. The notification may comprise information indicating at least one suggested application of the one or more applications available to be launched. Further, the computing device may cause output of the notification via the user device.

20 Claims, 18 Drawing Sheets

(56) References Cited

U.S. PATENT DOCUMENTS

| | | | |
|---|---|---|---|
| 2012/0151039 A1* | 6/2012 | Sayko | H04N 21/234327 709/224 |
| 2015/0111616 A1 | 4/2015 | Kim | |
| 2016/0007233 A1* | 1/2016 | Rao | H04L 47/762 455/452.2 |
| 2016/0373311 A1* | 12/2016 | Kumar | G06F 3/04847 |
| 2021/0127150 A1* | 4/2021 | Alagarsamy | H04N 21/2662 |

OTHER PUBLICATIONS

X. Liu et al., "Understanding Diverse Usage Patterns from Large-Scale Appstore—Service Profiles," in IEEE Transactions on Software Engineering, vol. 44, No. 4, pp. 384-411, Apr. 1, 2018, (Year: 2018).*

Jun. 2, 2021 (WO) International Search Report and Written Opinion—App. PCT/CN2020/138665.

* cited by examiner

Table A

| User ID | Device ID | Network ID | StoreName | Maximum Available Bandwidth | Duration | Network Quality |
|---|---|---|---|---|---|---|
| User A | 11 | 33 | StoreA | 50kbps | 2 Hours | Poor |
| User B | 22 | 44 | StoreB | 200kbps | 1 Week | Good |

FIG. 9A

Table B

| User ID | StoreName | Network ID | Running App Names | Running App Bandwidth | Available Bandwidth |
|---|---|---|---|---|---|
| User A | StoreA | 33 | [Notepad, Google Chrome] | [10kbps, 30kbps] | 20kbps |
| User A | StoreB | 33 | [Microsoft Outlook, Microsoft Teams] | [30kbps, 100kbps] | 10kbps |

FIG. 9B

Table C

| User ID | App Name | Network ID | Minimum Bandwidth | Maximum Bandwidth | Average Bandwidth | Use Time | Network Quality |
|---|---|---|---|---|---|---|---|
| User A | Notepad | 33 | 10kbps | 30kbps | 15.6kbps | 57 Minutes | Poor |
| User B | Microsoft Teams | 44 | 10kbps | 100kbps | 70kbps | 3 Days | Good |

FIG. 9C

NETWORK ENVIRONMENT-BASED DYNAMIC APPLICATION RECOMMENDATION

CROSS-REFERENCE TO RELATED APPLICATIONS

This application is a continuation of co-pending International Application No. PCT/CN2020/138665, entitled "NETWORK ENVIRONMENT-BASED DYNAMIC APPLICATION RECOMMENDATION" and filed on Dec. 23, 2020. The content of which is incorporated herein by reference in its entirety.

FIELD

Aspects described herein generally relate to computer networking, remote computer access, cloud computing systems, and hardware and software related thereto. More specifically, one or more aspects describe herein provide dynamic resource recommendation based on a network environment.

BACKGROUND

Network quality has become an important aspect of many people's daily lives. In particular, an increasing number of users rely on stable and fast network connections to access applications hosted on remote servers. Network bandwidth, which measures an amount of data transmission during a time period, affects the performance of the applications. Different applications may require different levels of network bandwidth to have a smooth experience. For example, streaming online videos may require a substantial amount of network bandwidth.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Although users can generally access and use different online applications with a stable internet connection, users often suffer from inadequate network bandwidth. As an example, when a network is shared by a large number of users, the allocated network bandwidth for one user might be not suitable for some applications. In addition, users often are not adequately informed of their network environment. For example, when a user desires to use an online application that generally consumes a substantial amount of internet bandwidth, the user might not know that the user's network conditions are not suitable for using the application. Further, the available network bandwidth may constantly change based on the number of users that share the network and the number of applications that are currently in use. But the users might not be informed of the real-time changes of the network bandwidth. Thus, there remains a need to improve users' experiences in selecting and using applications via a network.

To overcome limitations described above, and to overcome other limitations that will be apparent upon reading and understanding the present specification, aspects described herein are directed towards network environment-based dynamic application recommendation.

In an embodiment of the present disclosure, a method may be provided for network environment-based dynamic application recommendation. In the method, a computing device may determine a maximum available bandwidth for a user device. The computing device may determine, based on a network bandwidth associated with one or more applications running on the user device, a currently available bandwidth for the user device. The computing device may determine an estimated network bandwidth associated with one or more applications available to be launched via the user device. Subsequently, the computing device may determine, based on the maximum available bandwidth, the currently available bandwidth for the user device, and the estimated network bandwidth associated with the one or more applications available to be launched, a notification. The notification may comprise information indicating at least one suggested application of the one or more applications available to be launched. The computing device may cause output of the notification via the user device.

In an embodiment of the present disclosure, an apparatus may be provided for network environment-based dynamic application recommendation. The apparatus comprises one or more processors; and memory storing instructions that, when executed by the one or more processors, cause the apparatus to determine a maximum available bandwidth for a user device. The instructions may further cause the apparatus to determine, based on a network bandwidth associated with one or more applications running on the user device, a currently available bandwidth for the user device. In addition, the instructions may further cause the apparatus to determine an estimated network bandwidth associated with one or more applications available to be launched via the user device. The instructions may further cause the apparatus to determine, based on the maximum available bandwidth, the currently available bandwidth for the user device, and the estimated network bandwidth associated with the one or more applications available to be launched, a notification. The notification may comprise information indicating at least one suggested application of the one or more applications available to be launched. The instructions may further cause the apparatus to cause output of the notification via the user device.

In an embodiment of the present disclosure, one or more non-transitory computer readable media may be provided to perform one or more of the processes described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 9A-9C depict example tables that may be used in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Figure 1:
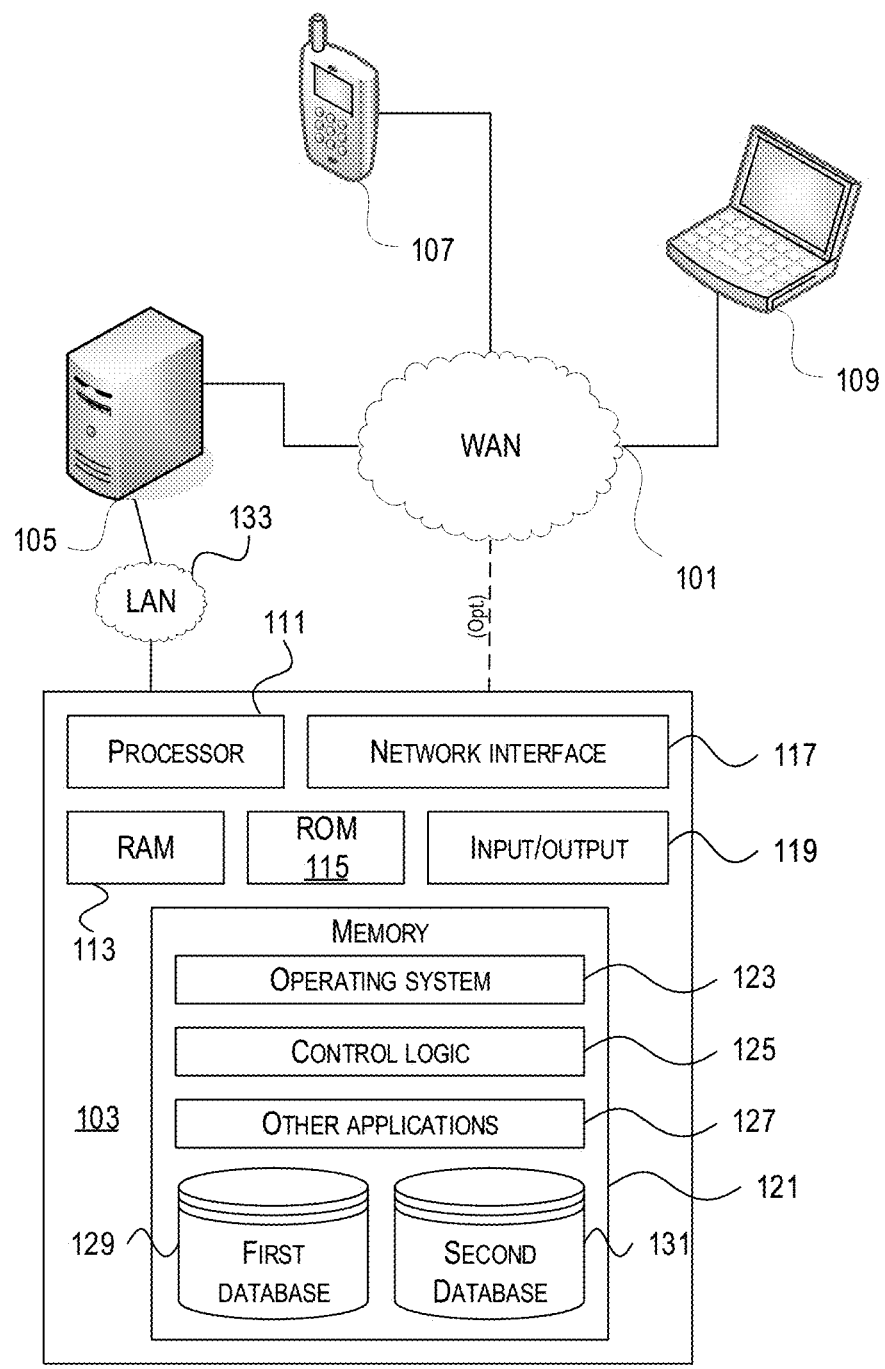
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with the data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may or might not be used in conjunction with aspects described herein. Control logic 125 may also be referred to herein as data server software 125. Functionality of data server software 125 may refer to operations or decisions made automatically based on rules coded into control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, first database 129 may include second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
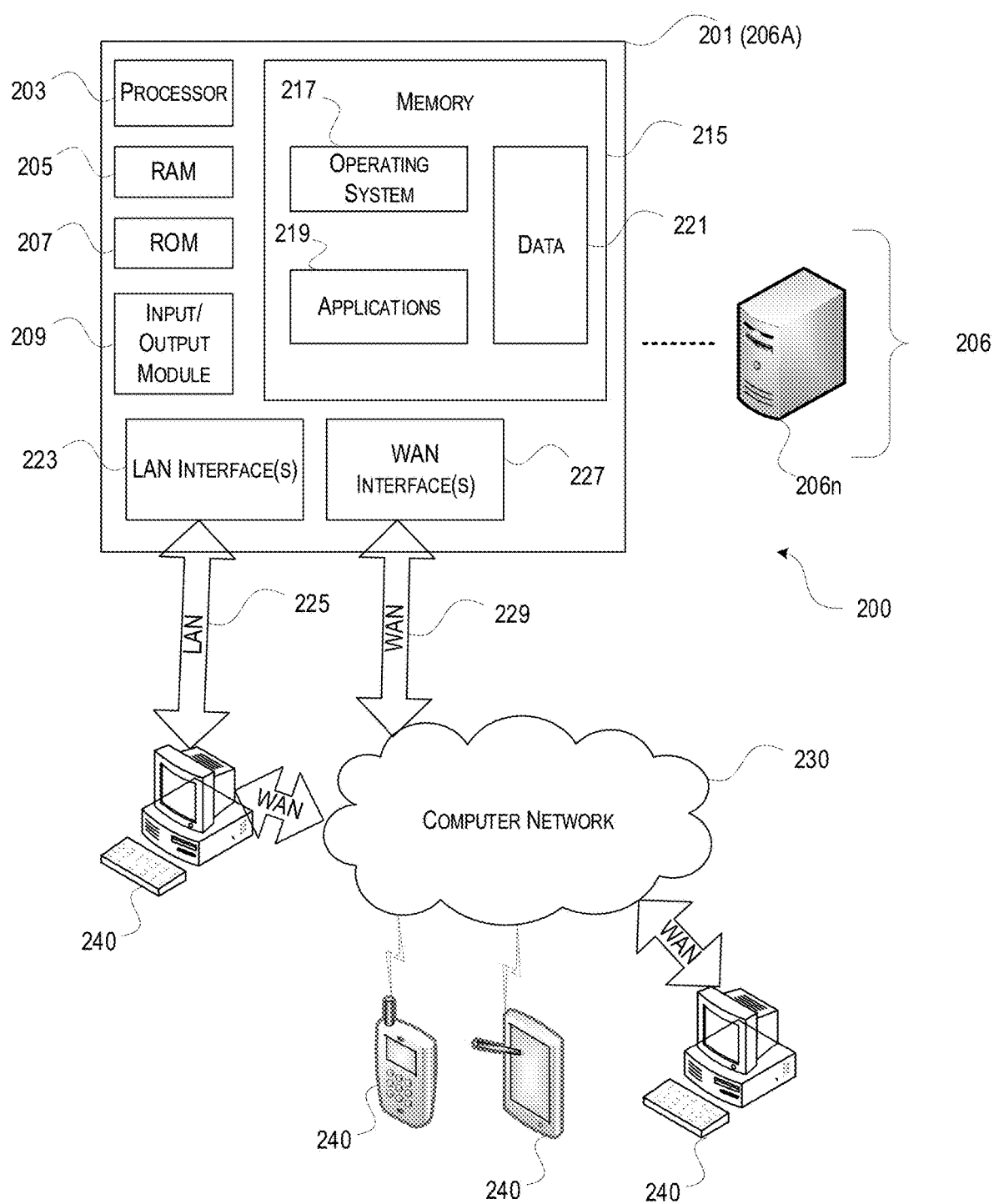
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. Computing device 201 may have a processor 203 for controlling overall operation of computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by computing device 201, such as an operating system 217, application programs 219, and an associated database 221.

Computing device 201 may operate in a networked environment supporting connections to one or more remote computers, such as terminals 240 (also referred to as client devices and/or client machines). Terminals 240 may be personal computers, mobile devices, laptop computers, tablets, or servers that include many or all of the elements described above with respect to computing device 103 or 201. The network connections depicted in FIG. 2 include a local area network (LAN) 225 and a wide area network (WAN) 229, but may also include other networks. When used in a LAN networking environment, computing device 201 may be connected to LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. Server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments server farm 206 may be administered as a single entity, while in other embodiments server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by client machine 240 with a response from second server 206b (not shown.) First server 206a may acquire an enumeration of applications available to client machine 240 as well as address information associated with an application server 206 hosting an application identified within the enumeration of applications. First server 206a can then present a response to the client's request using a web interface, and communicate directly with client 240 to provide client 240 with access to an identified application. One or more clients 240 and/or one or more servers 206 may transmit data over network 230, e.g., network 101.

Figure 3:
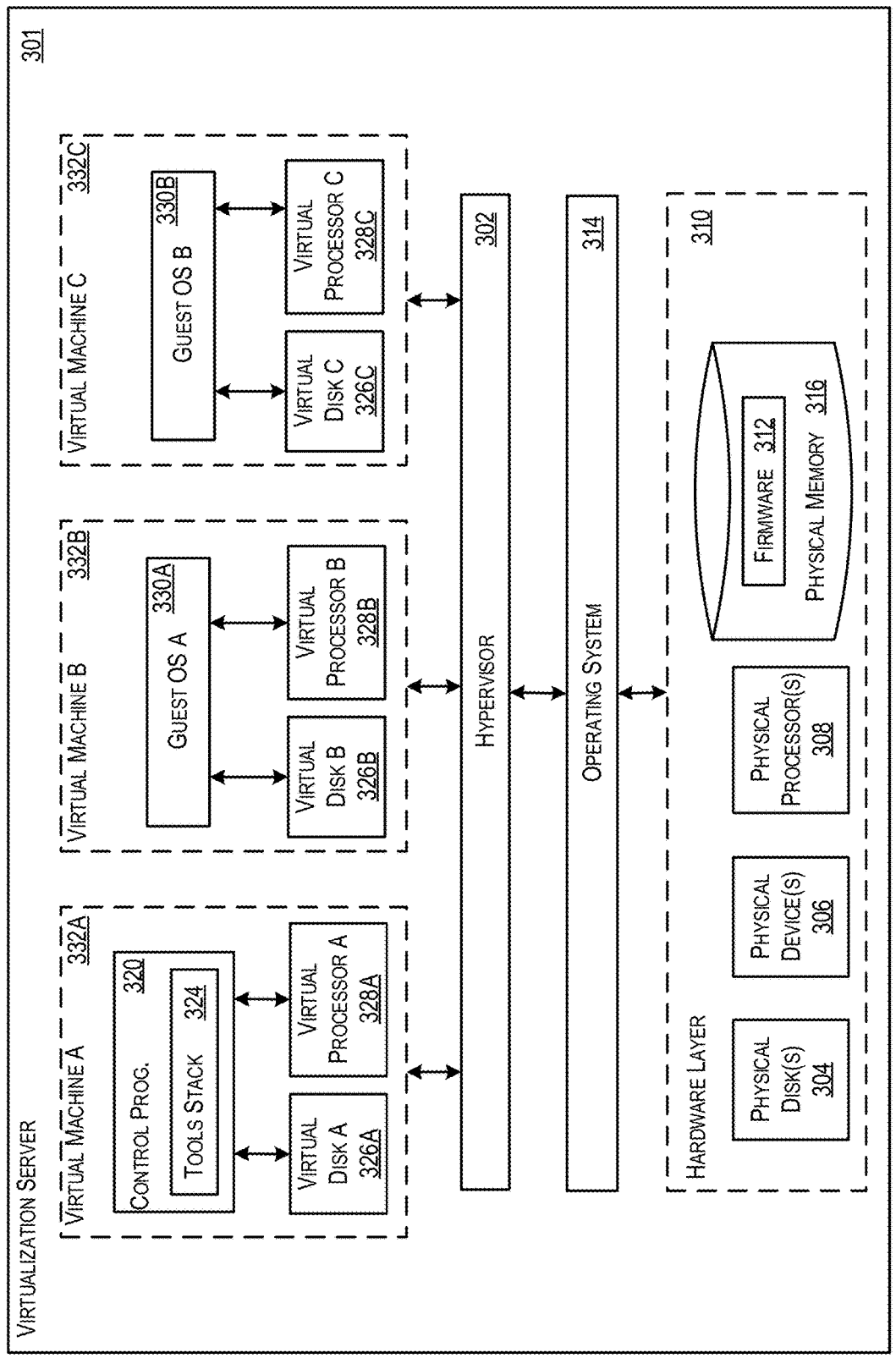
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in physical memory 316 and can be executed by one or more of physical processors 308. Virtualization server 301 may further include an operating system 314 that may be stored in a memory element in physical memory 316 and executed by one or more of physical processors 308. Still further, a hypervisor 302 may be stored in a memory element in physical memory 316 and can be executed by one or more of physical processors 308.

Executing on one or more of physical processors 308 may be one or more virtual machines 332A-C(generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, DomO, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 can be executed by one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on virtualization server 301. Virtual machines may then execute at a level above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within the hardware layer 310. That is, while a Type 2 hypervisor 302 accesses system resources through a host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, can provide virtual resources to operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C(generally 332) in which guest operating systems 330 execute. In some embodiments, hypervisor 302 may load a virtual machine image to create a virtual machine 332. In other embodiments, hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to virtual machine 332.

As shown in FIG. 3, virtualization server 301 may host or execute one or more virtual machines 332. A virtual machine 332 is a set of executable instructions that, when executed by a processor 308, may imitate the operation of a physical computer such that virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include a virtual disk 326A-C(generally 326) and a virtual processor 328A-C (generally 328.) Virtual disk 326, in some embodiments, is a virtualized view of one or more physical disks 304 of virtualization server 301, or a portion of one or more physical disks 304 of virtualization server 301. The virtualized view of physical disks 304 can be generated, provided, and managed by hypervisor 302. In some embodiments, hypervisor 302 provides each virtual machine 332 with a unique view of the physical disks 304. Thus, in these embodiments, particular virtual disk 326 included in each virtual machine 332 can be unique when compared with other virtual disks 326.

A virtual processor 328 can be a virtualized view of one or more physical processors 308 of virtualization server 301. In some embodiments, the virtualized view of physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of virtual processor 328 are different than the characteristics of the corresponding physical processor 308.

Figure 4:
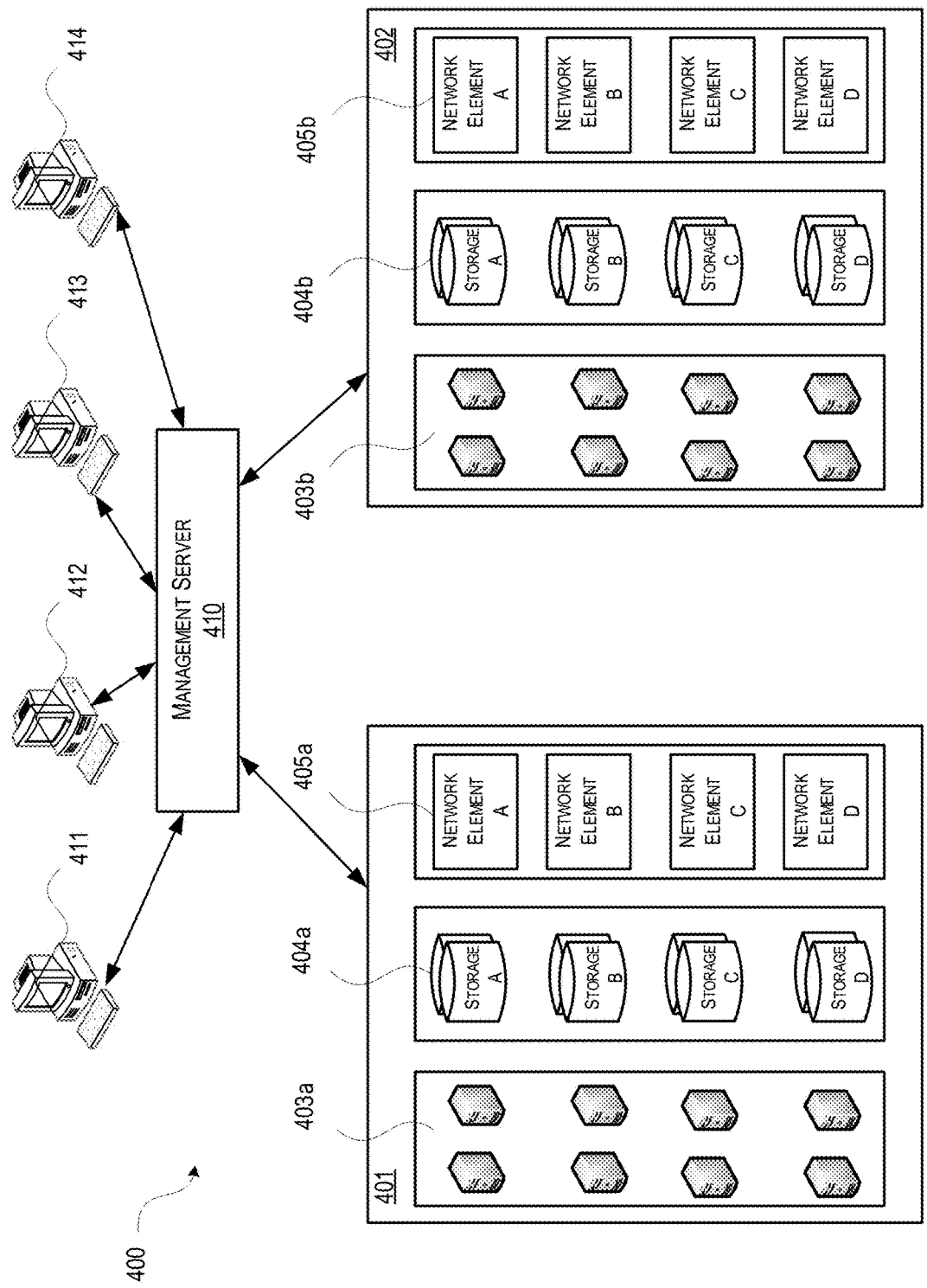
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. Management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, management server 410 may include a resource manager configured to select and provision physical resources in the hardware layer of the cloud system based on the client requests. For example, management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. Management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5A:
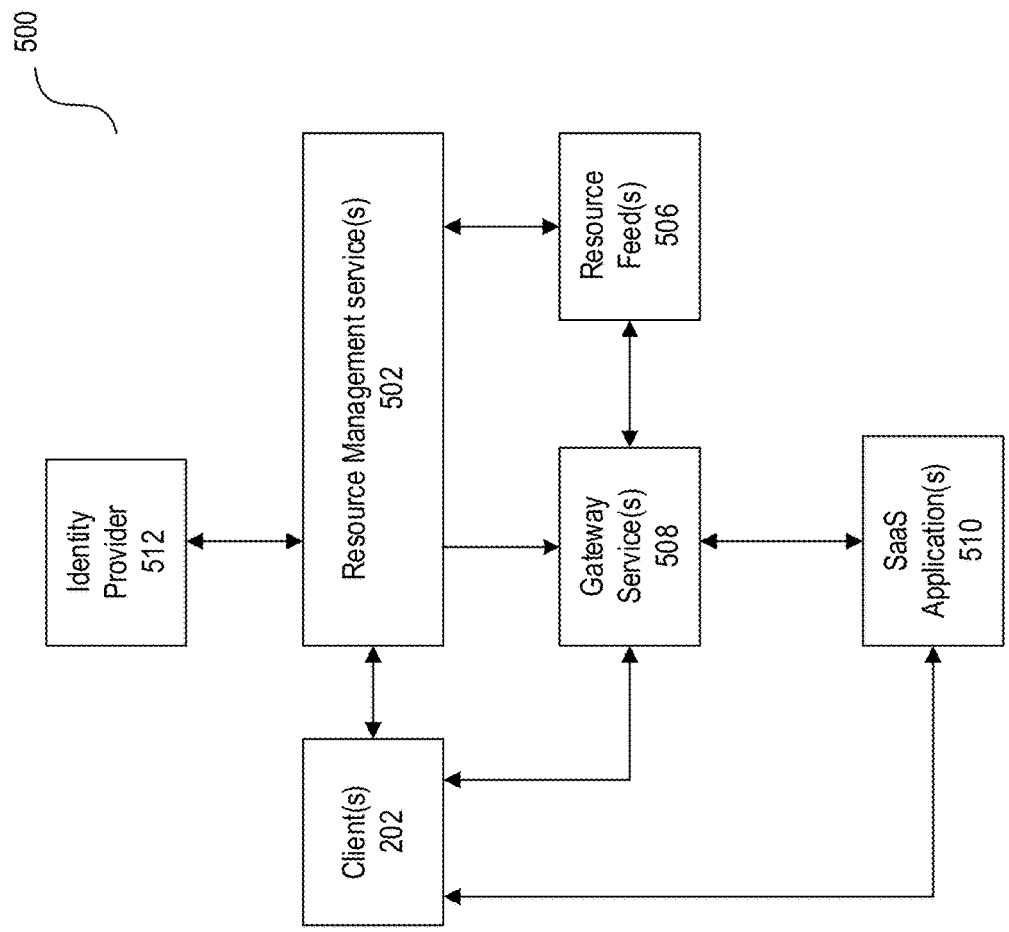
FIG. 5A is a block diagram of an example system in which resource management services may manage and streamline access by clients to resource feeds (via one or more gateway services) and/or software-as-a-service (SaaS) applications.

FIG. 5A is a block diagram of an example system 500 in which one or more resource management services 502 may manage and streamline access by one or more clients 202 to one or more resource feeds 506 (via one or more gateway services 508) and/or one or more software-as-a-service (SaaS) applications 510. In particular, resource management service(s) 502 may employ an identity provider 512 to authenticate the identity of a user of a client 202 and, following authentication, identify one of more resources the user is authorized to access. In response to the user selecting one of the identified resources, resource management service(s) 502 may send appropriate access credentials to requesting client 202, and client 202 may then use those credentials to access the selected resource. For the resource feed(s) 506, client 202 may use the supplied credentials to access the selected resource via a gateway service 508. For SaaS application(s) 510, client 202 may use the credentials to access the selected application directly.

The client(s) 202 may be any type of computing devices capable of accessing the resource feed(s) 506 and/or the SaaS application(s) 510, and may, for example, include a variety of desktop or laptop computers, smartphones, tablets, etc. The resource feed(s) 506 may include any of numerous resource types and may be provided from any of numerous locations. In some embodiments, for example, the resource feed(s) 506 may include one or more systems or services for providing virtual applications and/or desktops to the client(s) 202, one or more file repositories and/or file sharing systems, one or more secure browser services, one or more access control services for the SaaS applications 510, one or more management services for local applications on the client(s) 202, one or more internet enabled devices or sensors, etc. Each of the resource management service(s) 502, the resource feed(s) 506, the gateway service(s) 508, the SaaS application(s) 510, and the identity provider 512 may be located within an on-premises data center of an organization for which the system 500 is deployed, within one or more cloud computing environments, or elsewhere.

Figure 5B:
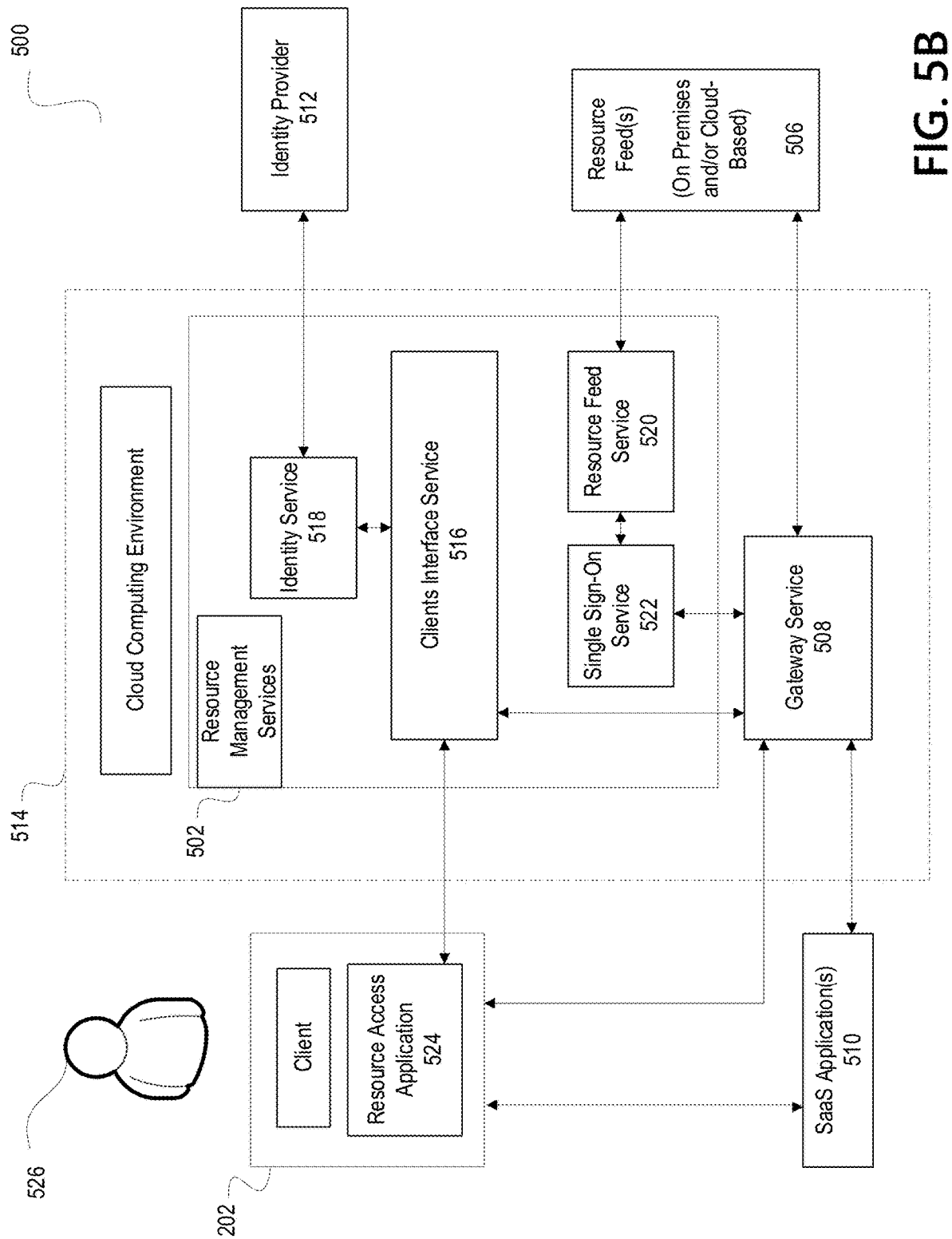
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 508 are located within a cloud computing environment 514. The cloud computing environment may, for example, include Microsoft Azure Cloud, Amazon Web Services, Google Cloud, or IBM Cloud.

For any of illustrated components (other than client 202) that are not based within cloud computing environment 514, cloud connectors (not shown in FIG. 5B) may be used to interface those components with cloud computing environment 514. Such cloud connectors may, for example, run on Windows Server instances hosted in resource locations and may create a reverse proxy to route traffic between the site(s) and cloud computing environment 514. In the illustrated example, the cloud-based resource management services 502 include a client interface service 516, an identity service 518, a resource feed service 520, and a single sign-on service 522. As shown, in some embodiments, client 202 may use a resource access application/platform 524 to communicate with client interface service 516 as well as to present a user interface on the client 202 that a user 526 can operate to access resource feed(s) 506 and/or SaaS application(s) 510. The resource access application 524 may either be installed on client 202, or may be executed by client interface service 516 (or elsewhere in system 500) and accessed using a web browser (not shown in FIG. 5B) on client 202.

As explained in more detail below, in some embodiments, resource access application 524 and associated components may provide user 526 with a personalized, all-in-one interface (e.g., interfaces described in connection with FIGS. 6-8D) enabling instant and seamless access to all the user's SaaS and web applications, files, virtual Windows applications, virtual Linux applications, desktops, mobile applications, Citrix Virtual Apps and Desktops™, local applications, and other data.

When resource access application 524 is launched or otherwise accessed by user 526, client interface service 516 may send a sign-on request to identity service 518. In some embodiments, identity provider 512 may be located on the premises of the organization for which system 500 is deployed. Identity provider 512 may, for example, correspond to an on-premises Windows Active Directory. In such embodiments, identity provider 512 may be connected to cloud-based identity service 518 using a cloud connector (not shown in FIG. 5B), as described above. Upon receiving a sign-on request, identity service 518 may cause the resource access application 524 (via client interface service 516) to prompt user 526 for the user's authentication credentials (e.g., user-name and password). Upon receiving the user's authentication credentials, client interface service 516 may pass the credentials along to identity service 518, and identity service 518 may, in turn, forward them to identity provider 512 for authentication, for example, by comparing them against an Active Directory domain. Once identity service 518 receives confirmation from identity provider 512 that the user's identity has been properly authenticated, client interface service 516 may send a request to resource feed service 520 for a list of subscribed resources for user 526.

In other embodiments (not illustrated in FIG. 5B), identity provider 512 may be a cloud-based identity service, such as a Microsoft Azure Active Directory. In such embodiments, upon receiving a sign-on request from client interface service 516, identity service 518 may, via client interface service 516, cause client 202 to be redirected to the cloud-based identity service to complete an authentication process. The cloud-based identity service may then cause client 202 to prompt user 526 to enter the user's authentication credentials. Upon determining the user's identity has been properly authenticated, the cloud-based identity service may send a message to resource access application 524 indicating the authentication attempt was successful, and resource access application 524 may then inform the client interface service 516 of the successfully authentication. Once the identity service 518 receives confirmation from client interface service 516 that the user's identity has been properly authenticated, client interface service 516 may send a request to resource feed service 520 for a list of subscribed resources for user 526.

For each configured resource feed, resource feed service 520 may request an identity token from the single sign-on service 522. Resource feed service 520 may then pass the feed-specific identity tokens it receives to the points of authentication for respective resource feeds 506. Each resource feed 506 may then respond with a list of resources configured for the respective identity. Resource feed service 520 may then aggregate all items from the different feeds and forward them to client interface service 516, which may cause resource access application 524 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®, one or more secure browsers, one or more internet enabled devices or sensors, one or more local applications installed on client 202, and/or one or more SaaS applications 510 to which user 526 has subscribed). The lists of local applications and SaaS applications 510 may, for example, be supplied by resource feeds 506 for respective services that manage which such applications are to be made available to user 526 via resource access application 524. Examples of SaaS applications 510 that may be managed and accessed as described herein include Microsoft Office 365 applications, SAP SaaS applications, Workday applications, etc.

For resources other than local applications and SaaS application(s) 510, upon user 526 selecting one of the listed available resources, resource access application 524 may cause client interface service 516 to forward a request for the specified resource to resource feed service 520. In response to receiving such a request, resource feed service 520 may request an identity token for the corresponding feed from the single sign-on service 522. The resource feed service 520 may then pass the identity token received from single sign-on service 522 to client interface service 516 where a launch ticket for the resource may be generated and sent to resource access application 524. Upon receiving the launch ticket, resource access application 524 may initiate a secure session to gateway service 508 and present the launch ticket. When gateway service 508 is presented with the launch ticket, it may initiate a secure session to the appropriate resource feed and present the identity token to that feed to seamlessly authenticate user 526. Once the session initializes, client 202 may proceed to access the selected resource.

When user 526 selects a local application, resource access application 524 may cause the selected local application to launch on client 202. When user 526 selects a SaaS application 510, resource access application 524 may cause client interface service 516 request a one-time uniform resource locator (URL) from gateway service 508 as well a preferred browser for use in accessing SaaS application 510. After gateway service 508 returns the one-time URL and identifies the preferred browser, client interface service 516 may pass that information along to resource access application 524. Client 202 may then launch the identified browser and initiate a connection to the gateway service 508. Gateway service 508 may then request an assertion from single sign-on service 522. Upon receiving the assertion, gateway service 508 may cause the identified browser on client 202 to be redirected to the logon page for identified SaaS application 510 and present the assertion. The SaaS may then contact gateway service 508 to validate the assertion and authenticate user 526. Once the user has been authenticated, communication may occur directly between the identified browser and selected SaaS application 510, thus allowing user 526 to use client 202 to access selected SaaS application 510.

In some embodiments, the preferred browser identified by the gateway service 508 may be a specialized browser embedded in resource access application 524 (when the resource application is installed on client 202) or provided by one of resource feeds 506 (when resource application 524 is located remotely), e.g., via a secure browser service. In such embodiments, SaaS applications 510 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of resource feed(s) 506) for assessment of its security risk by a web filtering service. For approved URLs, the specialized browser may be permitted to access the link. For suspicious links, however, the web filtering service may have client interface service 516 send the link to a secure browser service, which may start a new virtual browser session with client 202, and thus allow the user to access the potentially harmful linked content in a safe environment.

In some embodiments, in addition to or in lieu of providing user 526 with a list of resources that are available to be accessed individually, as described above, user 526 may instead be permitted to choose to access a streamlined feed of event notifications and/or available actions that may be taken with respect to events that are automatically detected with respect to one or more of the resources. This streamlined resource activity feed, which may be customized for each user 526, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to client 202 to notify user 526 of something that requires the user's attention (e.g., approval of an expense report, new course available for registration, etc.).

Network Environment-Based Dynamic Application Recommendation

Aspects of the present disclosure describe network environment-based dynamic application recommendations. In some examples, aspects of the present disclosure describe notifying users of the current network bandwidth usage and providing real-time application recommendations. The described mechanism and method not only apply to virtual resources such as online, web, and/or remote applications, but may apply generally to many other areas such as microapps, virtual applications and desktops, and/or SaaS in the marketplace or in workspace.

As illustrated in greater detail below, some aspects of the disclosure may provide technical benefits that are not provided by conventional systems. For example, one or more aspects of the disclosure may identify and recommend suitable applications to be launched before the user's selection of the applications so that the user may have a smooth experience. In another example, one or more aspects of the disclosure may provide recommendations when a user desires to launch an application that is not suitable to be launched under the current network environment. Various other technical benefits may be achieved as well.

A workspace may host backend resources (e.g., SaaS applications 524, desktops, files) via a network. The quality of the network (e.g., network bandwidth, network speed, network throughput, network latency, network jitter, network error rate) may affect users' experiences in accessing and using the resources. For example, different types of applications may run differently under the same network conditions because each type of application may have specific requirements on network bandwidth. A downlink rate of 20 kbps (e.g., a 2G/3G network) may support virtual applications such as Notepad; a downlink rate of 100 kbps (e.g., a 4G network, a public Wi-Fi network) may support virtual applications such as Google Chrome and/or Microsoft Outlook; and a downlink rate of 300 kbps (e.g., a wired broadband network) may support virtual applications such as Microsoft Outlook and Microsoft Teams, and/or Microsoft Managed Desktop.

Figure 6:
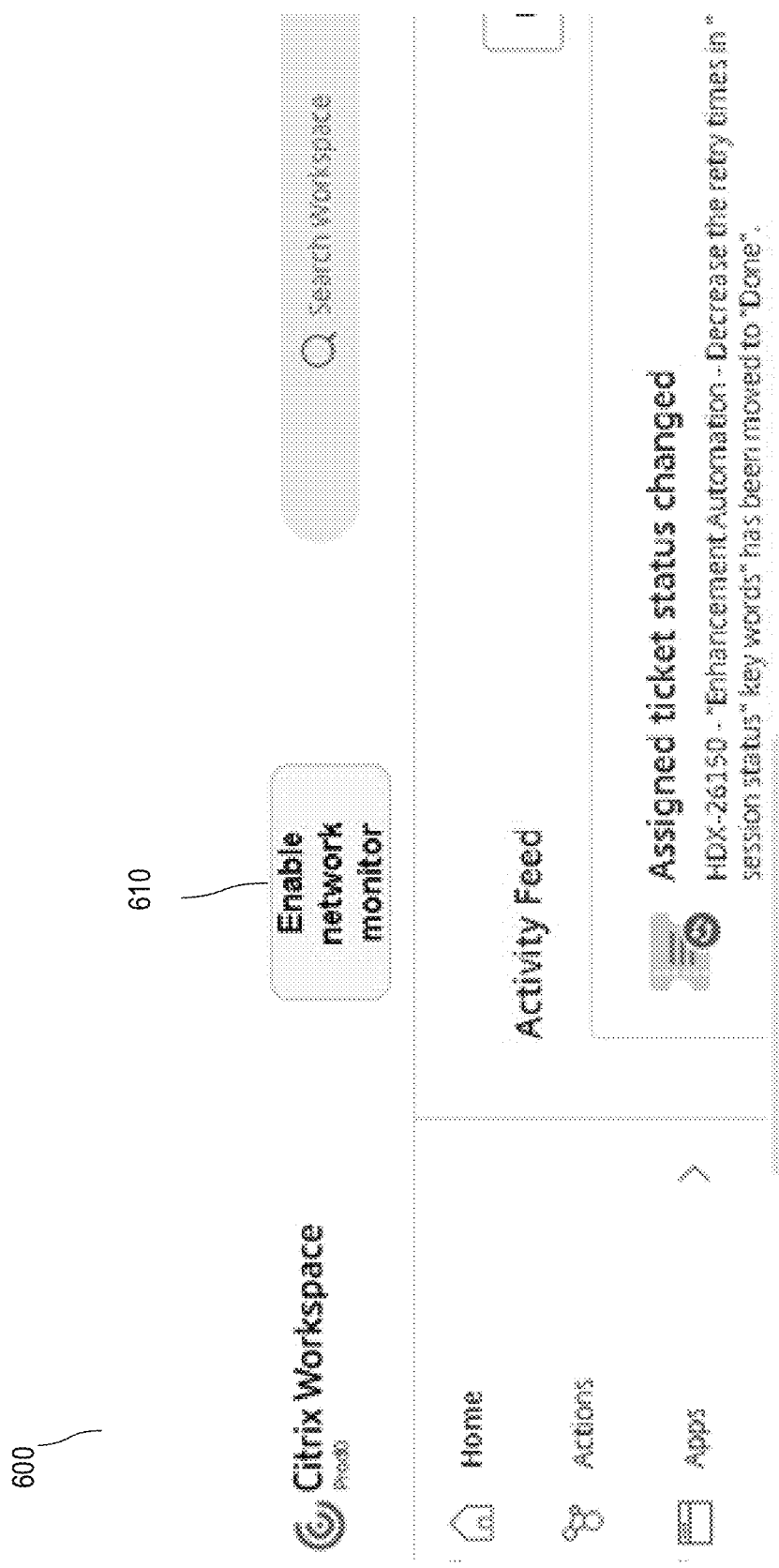
FIG. 6 depicts an example graphical user interface for enabling network monitoring that may be used in accordance with one or more illustrative aspects described herein.
Figure 7A:
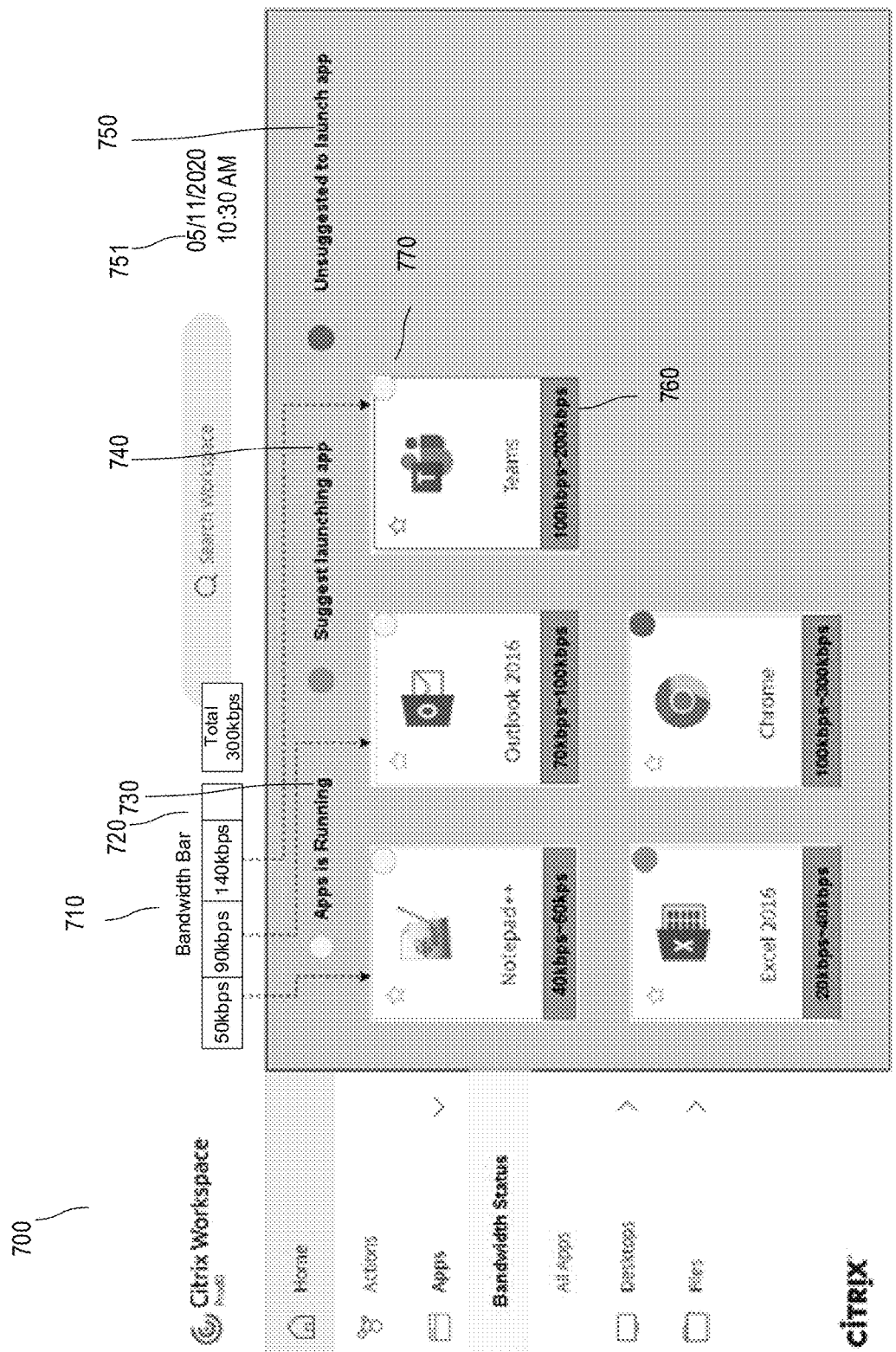
FIGS. 7A-7E depict example graphical user interfaces for providing application recommendations that may be used in accordance with one or more illustrative aspects described herein.
Figure 7B:
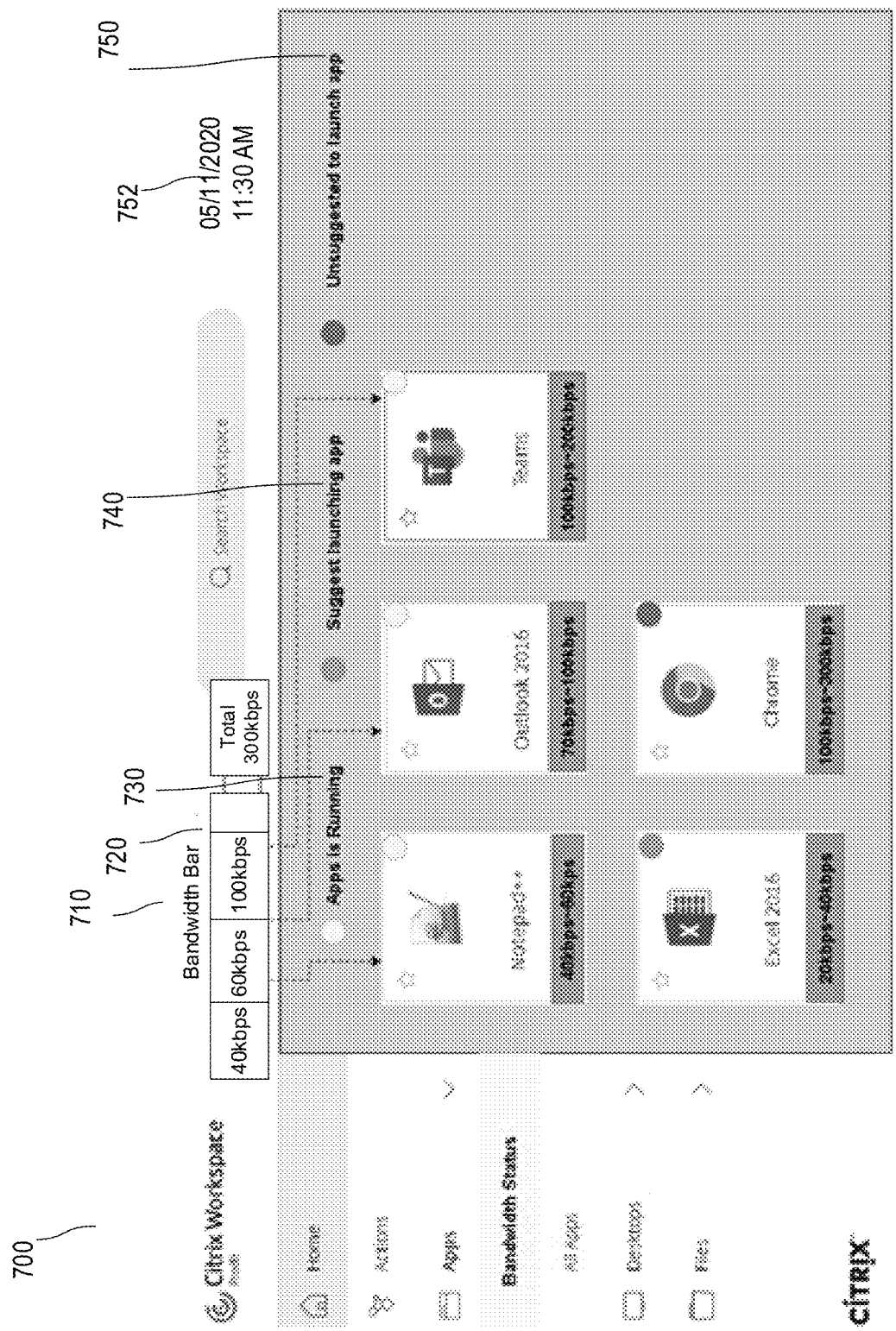
Figure 7C:
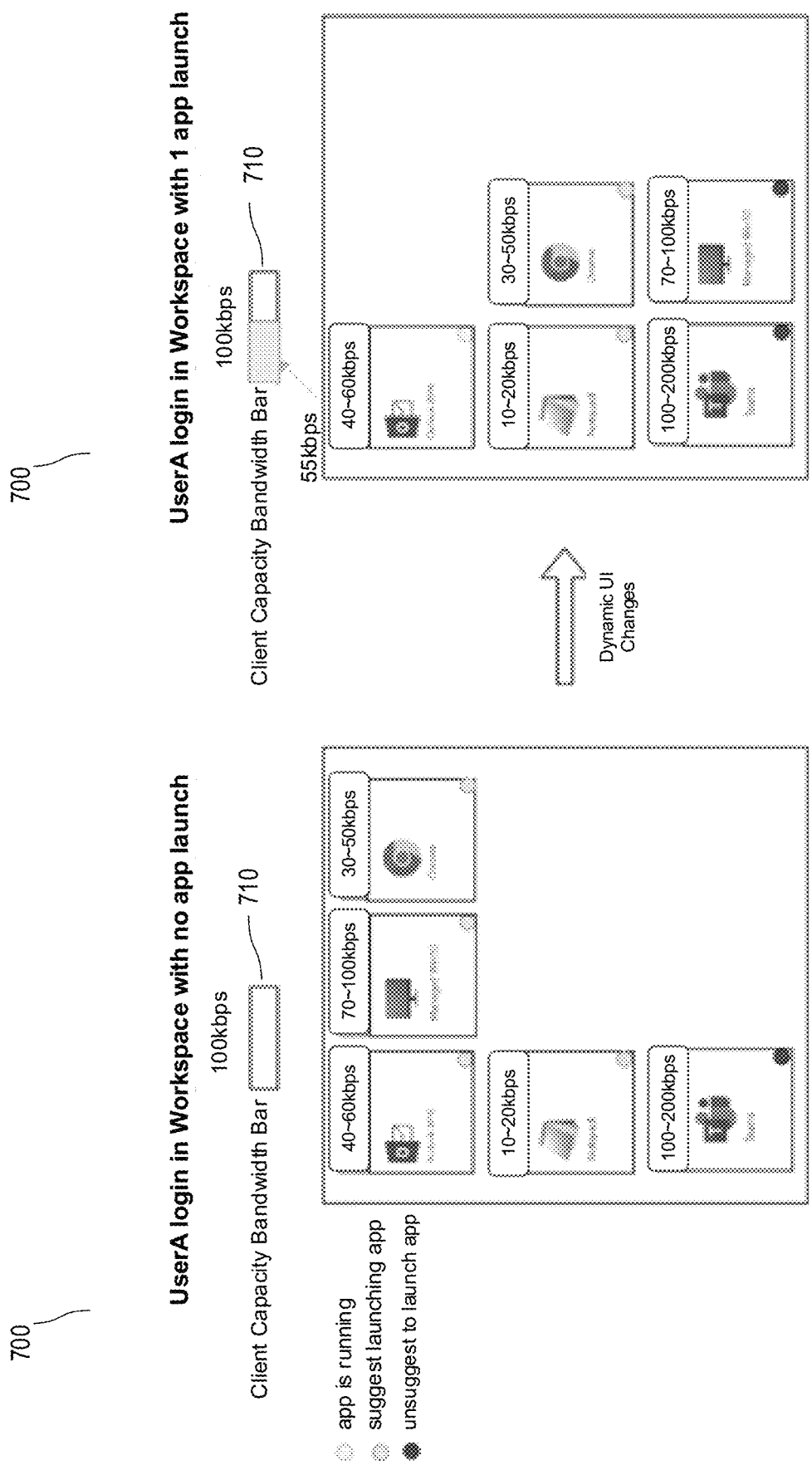
Figure 7D:
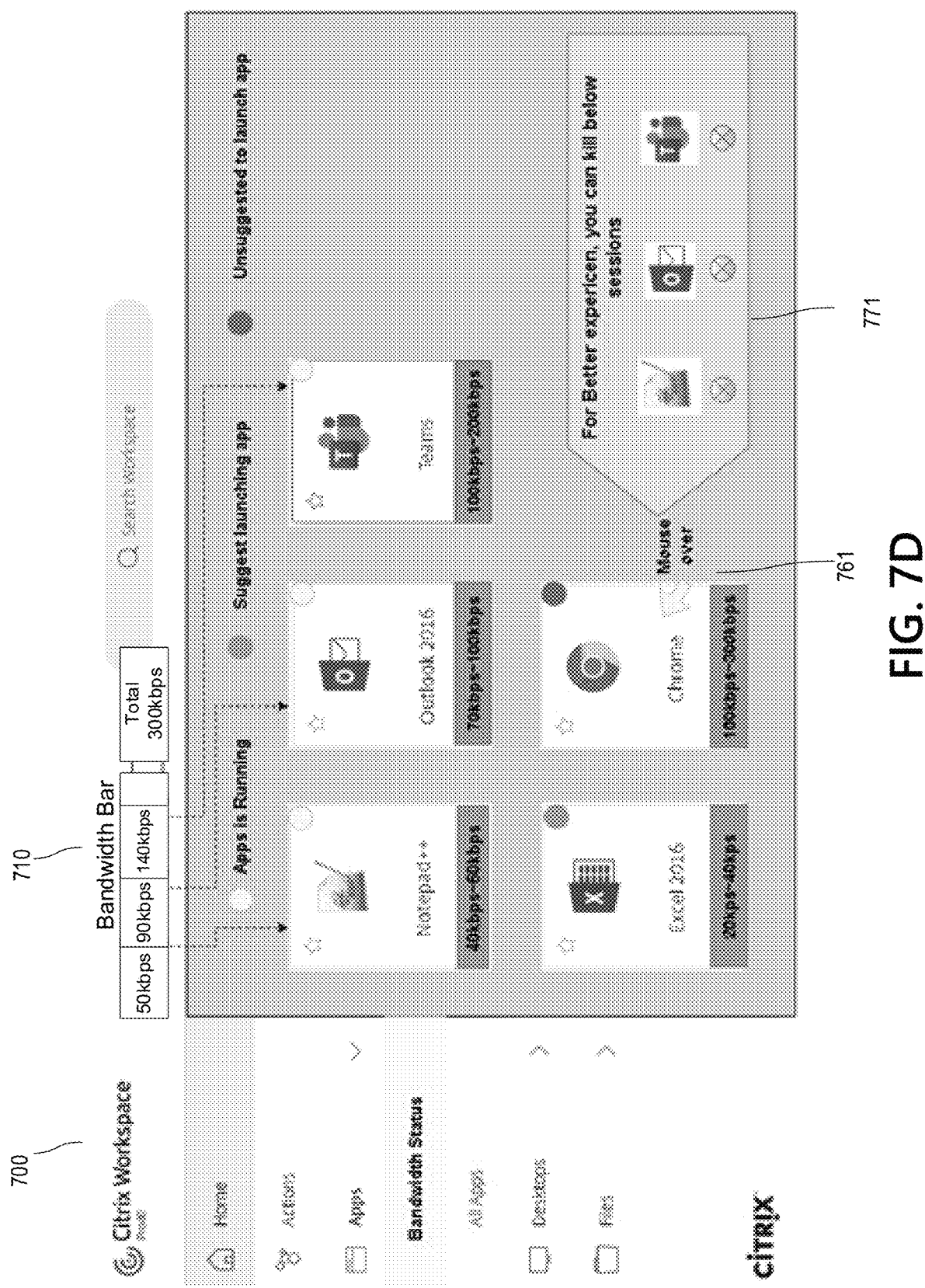
Figure 7E:
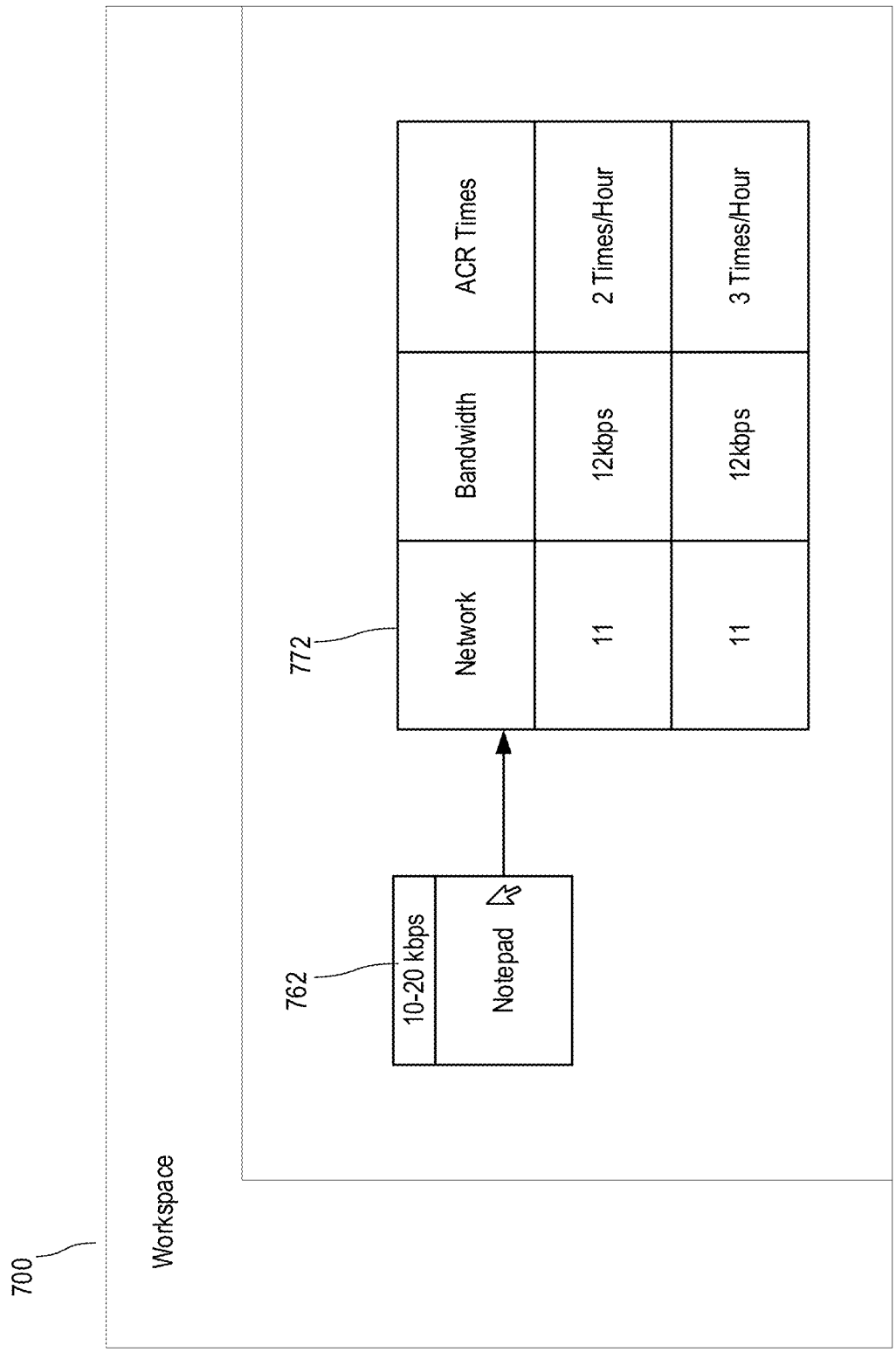

FIGS. 6-7E depict example graphical user interfaces that may be used in accordance with one or more illustrative aspects described herein. The user interfaces may be part of interfaces that enable instant and seamless access to all the user's SaaS and web applications, files, virtual Windows applications, virtual Linux applications, desktops, mobile applications, Citrix Virtual Apps and Desktops™, local applications, and other data via, for example, one or more resource access application 524. The user interfaces may have different appearances from those shown in the figures herein, depending upon the implementations thereof.

FIG. 6 depicts an example graphical user interface for enabling network monitoring that may be used in accordance with one or more illustrative aspects described herein. In FIG. 6, a user interface 600 may depict a client (e.g., client 202, system 500, a workspace application) of a remote desktop (e.g., Citrix Virtual Desktop). The client may allow users to access resources and/or settings related to the resources via resource access application 524. In particular, user interface 600 may provide one or more options a user (e.g., user 526) may select and/or otherwise interact with to select, modify, control, or otherwise configure settings related to network monitoring. For example, user interface 600 may provide a network monitor icon 610 (e.g., a button) for selection. Network monitor icon 610, once selected, may enable the client, the remote desktop, and/or a server (e.g., a bandwidth information server) to monitor the network bandwidth usage associated with the client. For example, when a user logs into the client, the user may click on network monitor icon 610 and be informed of the real-time network bandwidth usage. In some examples, the network bandwidth usage may be automatically monitored once a user starts an application session, even if the network monitoring function is not enabled by the user. Details of network bandwidth monitoring will be described in connection with FIG. 8.

FIGS. 7A-7E depict example graphical user interfaces for providing application recommendations in real-time that may be used in accordance with one or more illustrative aspects described herein. For example, after the network monitoring function (e.g., network monitor icon 610 is selected) is enabled, a user interface 700 may provide various types of information indicating the current network bandwidth usage. For example, user interface 700 may display a network bandwidth indicator 710 (e.g., a network bandwidth bar) to indicate the progress of real-time network bandwidth usage. Network bandwidth indicator 710 may indicate a maximum available network bandwidth associated with a client (e.g., client 202, system 500, a workspace application) for accessing and/or using one or more resources. For example, as shown in FIGS. 7A and 7B, network bandwidth indicator 710 indicates that the maximum available network bandwidth is 300 kbps. In FIG. 7C, network bandwidth indicator 710 indicates that the maximum available network bandwidth is 100 kbps. The maximum available network bandwidth may be the maximum amount of data that can be transferred from the client to a server (e.g., resource management service 502, a remote server that supplies resources) within a network during a time period. In some examples, the maximum available network bandwidth may correspond to the maximum length of network bandwidth indicator 710. Details of the determination of the maximum available network bandwidth will be described in connection with FIG. 8.

Further, network bandwidth indicator 710 may indicate the network bandwidth associated with each running application. For example, network bandwidth indicator 710 may comprise one or more boxes and each box may comprise information indicating an amount of network bandwidth (e.g., 50 kbps, 90 kbps, 140 kbps) associated with a respective running application. The width of each of the boxes may indicate the amount of network bandwidth associated with the respective running application. Network bandwidth indicator 710 may comprise a shaded area that indicates the amount of network bandwidth associated with the running applications and a blank area that indicates the amount of available network bandwidth. The network bandwidth associated with the respective running application may be the amount of network bandwidth that the application currently consumes or an estimated (e.g., an average) amount of network bandwidth associated with the application. The estimated amount of network bandwidth associated with each of the application may be determined (e.g., by a computing device such as a bandwidth information server, a bandwidth agent) for the user based on the user's previous network bandwidth usage associated with the application and/or other users' historical network bandwidth usage data.

In addition, user interface 700 may display one or more application icons and display a range of network bandwidth associated with each application 760 near (e.g., below, above) each application icon, as shown in FIGS. 7A-7D. For example, as shown in FIG. 7A, a Notepad application may consume a network bandwidth of 40 kbps-60 kbps; a Microsoft Outlook 2016 application may consume a network bandwidth of 70 kbps-100 kbps; a Microsoft Teams application may consume a network bandwidth of 100 kbps-200 kbps; a Microsoft Excel 2016 application may consume a network bandwidth of 20 kbps-40 kbps; and/or a Google Chrome application may consume a network bandwidth of 100 kbps-400 kbps.

The range of network bandwidth associated with each application (e.g., applications available to be launched) 760 may be determined based on a user's historical network bandwidth usage data and/or other users' historical network bandwidth usage data. The locations of the range of network bandwidth and the appearances of the application icons may be different from those shown in the figures herein, depending upon the implementations thereof. Additional details of the determination of the network bandwidth that each running application currently consumes, the estimated amount of network bandwidth associated with each application, and the range of network bandwidth associated with each application will be described in connection with FIGS. 8-11.

Network bandwidth indicator 710 may also indicate a currently available network bandwidth for the client based on the maximum available network bandwidth and the network bandwidth associated with one or more applications running on the client. For example, in FIG. 7A, the network bandwidth indicator 710 may include a box 720 that indicates the amount of currently available network bandwidth. The network bandwidth indicator 710 may display an amount of the currently available bandwidth inside or outside the box.

Additionally or alternatively, real-time network bandwidth consumption may be determined and network bandwidth indicator 710 may display the real-time network bandwidth consumption. As shown in FIG. 7A, user interface 700 may comprise time information such as a time 751. The displayed network usage information (e.g., the maximum available network bandwidth, the network bandwidth that each running application currently consumes, the range of network bandwidth associated with each application) may be associated with time 751 and may be updated based on time. Referring to FIG. 7B, when the time changes, as indicated by an updated time 752, the network usage information may also change. For example, the information (e.g., the currently available network bandwidth, the network bandwidth associated with each running application) associated with network bandwidth indicator 710 may be updated based on updated time 752. In addition, application recommendations may also change based on the updated network usage information.

The network usage information may be dynamically updated based on the user's usage of the applications. For example, the user may use Google Chrome to browse websites or watch a live stream of media content. The usage of the same application may affect the amount of network bandwidth that the application needs to consume. Additionally or alternatively, the network usage information may be dynamically updated as the applications are selected and/or closed. For example, as shown in FIG. 7C, network bandwidth indicator 710 may be updated based on a newly launched application—Microsoft Outlook 2016.

User interface 700 may comprise information that provides recommendations for launching one or more applications. For example, as shown in FIG. 7A, user interface 700 may comprise information indicating that a first set of applications 730 are currently running on the client, a second set of applications 740 that are suggested to launch, and a third set of applications 750 that are not suggested to launch. Each set of applications may be indicated by a specific visual cue 770 (e.g., a specific color or shape). For example, the first set of applications 730 may be indicated by one or more icons of a particular color and/or shape that are near the applications.

After a user selects, launches, closes, or otherwise configures an application, the currently available bandwidth and/or the recommendations for launching applications may be updated. Some applications that are previously indicated as suggested applications to be launched may no longer be recommended as suggested applications to be launched. Instead, they may be indicated as not suggested to be launched, as shown in FIG. 7C. Referring to FIG. 7C, applications on the same row may be associated with the same status (e.g., currently running, currently recommended, currently not recommended), and the status of one or more applications may be changed based on launching one application.

Referring to FIG. 7D, user interface 700 may provide recommendations for closing one or more applications based on the current network environment. For example, an application such as Google Chrome may be indicated as not suitable to be launched under the current network environment, and if a user still desires to launch the application, a pop-up notification 771 may be displayed under some circumstances. For example, the pop-up notification 771 may be displayed once a cursor is moved over an application icon 761. The pop-up notification 771 may comprise information indicating that the user may have a better experience using this application if the user closes one or more currently running applications. The pop-up notification 771 may also comprise information suggesting which applications to close based on the current network environment and/or the user's current and/or historical engagement with the applications. The currently running applications that consume a similar amount of network bandwidth (e.g., within a predetermined range of amount of network bandwidth) may be ranked based on the user's engagement with the applications. For example, if the user has not used (e.g., performed any action) a currently running application for a period of time, the application may be ranked higher than other applications and may be recommended to be closed, so that the user may have a better experience.

Referring to FIG. 7E, user interface 700 may display network information when a user desires to launch an application. For example, a pop-up notification 772 may be displayed once a cursor is moved over an application icon 762. Pop-up notification 772 may comprise historical network information of the application. For example, the network information may comprise, for each application session, a network ID, a historical network bandwidth associated with an application session or a recommended network bandwidth for the application, and/or auto client reconnections (ACR) times during the application session. The network ID may uniquely identify a network that is used during the application session. The auto client reconnections (ACR) times may inform the user of potential network quality issues for starting a session with the application. Based on network information contained in the pop-up notification, the user may make an informed decision of whether the user should launch an application session under the current environment. User interface 700 may contain other layouts of notifications to inform users of historical network information.

Figure 8:
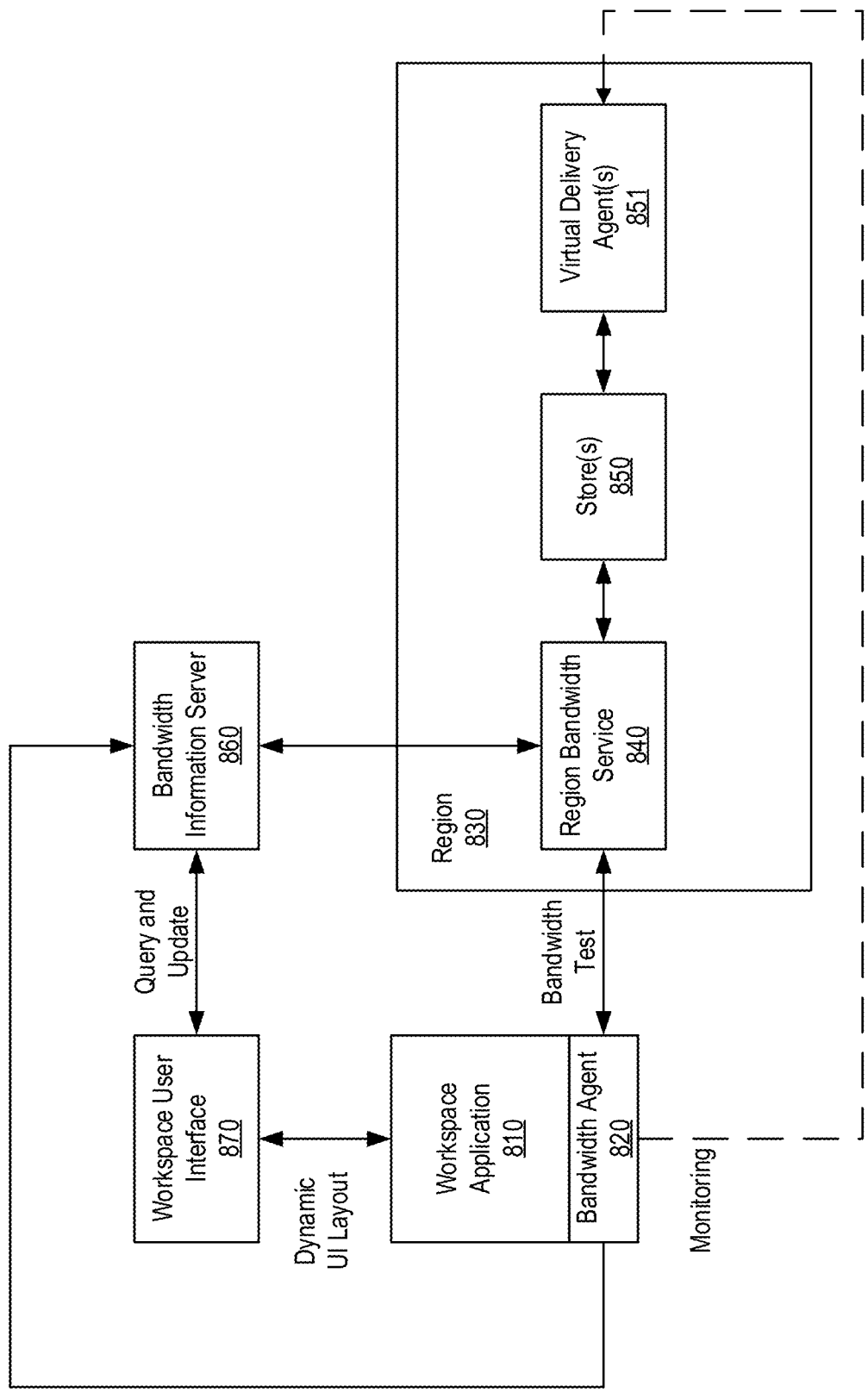
FIG. 8 depicts a schematic diagram showing an example system for providing application recommendations that may be used in accordance with one or more illustrative aspects described herein.

FIG. 8 depicts a schematic diagram showing an example system 800 for providing application recommendations based on the network environment that may be used in accordance with one or more illustrative aspects described herein. Referring to FIG. 8, the system 800 may comprise a workspace application 810, a bandwidth agent 820, a region 830, a bandwidth information server 860, and a workspace user interface 870.

Workspace application 810 may be a software platform that allows users to remotely access and use virtual resources. Some details of an example of a workspace application (e.g., system 500) have been described in connection with FIGS. 5A and 5B. Workspace application 810 may cause the output of workspace user interface 870. Workspace user interface 870 may be a personalized, all-in-one interface (e.g., user interfaces described in connection with FIGS. 6-7E) provided by, for example, resource access application 524 that enables instant and seamless access to all the virtual resources.

Region 830 may be a remote server (e.g., a site, resource management services 502) that manages and controls one or more virtual delivery agents (VDA) 851, and one or more stores 850. Region 830 may establish a connection (e.g., a wireless connection) with workspace application 810 and bandwidth information server 860. Region 830 may comprise a region bandwidth service 840 along with one or more virtual delivery agents (VDA) 851 and one or more stores 850. The stores 850 may supply virtual resources (e.g., resource feeds 506) such as local applications and/or SaaS applications (e.g., SaaS applications 510) and may provide users (e.g., user 526) with the virtual resources via, for example, resource access application 524. VDA 851 may register with a cloud connector and connections between region 830 and the user device may be brokered from resources to users after registration. VDA 851 may establish and manage the connections and apply policies that are configured for each application session. VDA 851 may comprise application virtualization software such as XENAPP® or XENDESKTOP®. An application session may begin when a user starts an application (e.g., the user tries to access an application supplied by store 850) and may end when the application exits or when the user exits workspace application 810. Each VDA may be associated with one application session.

Because region 830 may comprise more than one store 850 based on the cloud deployment, one or more rules may be applied to split the network bandwidth associated with region 830 for each of the stores 850. The rules may be determined based on the virtual resources supplied by the stores 850 and the cloud architecture.

Bandwidth agent 820 may be a node, a module, or a sub-module integrated with workspace application 810. Bandwidth agent 820 may determine a maximum available network bandwidth associated with a user device for accessing and/or using one or more resources supplied by store 850. For example, the maximum available network bandwidth may be determined based on (a) the network bandwidth associated with the user device (e.g., local or physical network bandwidth), and/or (b) the network bandwidth associated with region 830 (e.g., the data transfer rate between workspace application 810 and region bandwidth service 840). In some examples, if the network bandwidth associated with the user device is lower than the network bandwidth associated with region 830, the maximum available network bandwidth may be the network bandwidth associated with the user device. If the network bandwidth associated with the user device is higher than the network bandwidth associated with region 830, the maximum available network bandwidth may be the network bandwidth associated with region 830. The network bandwidth associated with region 830 may be measured based on software tools such as Iperf, which may generate data streams (e.g., network data packets) to measure the network bandwidth between two nodes (e.g., bandwidth agent 820 and region bandwidth service 840) in one or both directions.

Further, when a user starts an application session, bandwidth agent 820 may trigger a network bandwidth test for store 850. For example, bandwidth agent 820 may monitor the current network status (e.g., bandwidth consumption) for the current application session if the user enables network monitoring (e.g., selects network monitor icon 610). Bandwidth agent 820 may automatically monitor the current network status when a connection has been established between workspace application 810 and region 830. Bandwidth agent 820 may communicate with VDA 851 or an application bandwidth service in region 830 to determine the network bandwidth consumption and/or other network information (e.g., network bandwidth cost details) for the current application session. For example, bandwidth agent 820 may send data packets to VDA 851 to determine the network bandwidth consumption and/or other network information for the current application session. In this way, bandwidth agent 820 may collect information associated with the applications running on workspace application 810. Additionally or alternatively, bandwidth agent 820 may determine the network bandwidth consumption for the current application session based on the connection process (e.g., WFICA process) for the application session. In this way, bandwidth agent 820 may determine the network bandwidth consumption for each current application session.

Additionally or alternatively, bandwidth agent 820 may record the network bandwidth consumption and/or other network information (e.g., network bandwidth cost details) for each current application session. Bandwidth agent 820 may also record connection issues such as ACRs associated with the application session. The connection issues may be used to determine the quality of the network. Bandwidth agent 820 may send the network bandwidth information and the recorded connection issues to bandwidth information server 860 and/or region bandwidth service 840.

Region bandwidth service 840 may be a node, module, or a sub-module in region 830 that communicates with bandwidth agent 820 to determine the maximum available network bandwidth associated with the user device and the network bandwidth associated with each running application. For example, region bandwidth service 840 may determine, based on the network bandwidth associated with region 830, a maximum available network bandwidth associated with the user device for using one or more resources supplied by store 850. Region bandwidth service 840 may then send the maximum available network bandwidth to bandwidth information server 860.

In addition, region bandwidth service 840 may determine (e.g., calculate) a currently available network bandwidth based on the network bandwidth information sent by bandwidth agent 820. The calculated available network bandwidth may be sent to bandwidth information server 860. Bandwidth information server 860 may then store the currently available bandwidth. Each region 830 may comprise at least one region bandwidth service 840. Region bandwidth service 840 may establish a connection with store 850, which may enumerate applications. The store 850 may also establish a connection with VDA 851.

Bandwidth information server 860 may be a server that receives network bandwidth information and/or connection issues from bandwidth agent 820 and/or region bandwidth service 840. Bandwidth information server 860 may be a standalone server or may be integrated with resource management services 502, management server 410, and/or other servers. Bandwidth information server 860 or region bandwidth service 840 may also determine an estimated network bandwidth consumption and a range of network bandwidth consumption for each application based on a plurality of users' historical application usage and/or a current user's historical application usage. Bandwidth information server 860 may store data associated with the network bandwidth.

FIG. 9A-9C depict example tables that may be used in accordance with one or more illustrative aspects described herein. The tables may be stored in bandwidth information server 860 or region bandwidth service 840. Referring to FIG. 9A, table A may store network bandwidth information related to each user. For example, table A may store a user ID, a device ID, a network ID, a StoreName, the maximum available bandwidth associated with the user device, a duration of time, and/or a network quality indicator for the user. The user ID may uniquely identify a user (e.g., user 526). The device ID may be associated with a user device (e.g., client 202) and may uniquely identify the user device. The network ID may be associated with the network that is used to access the resources and may uniquely identify the network. The StoreName may uniquely identify the store that supplies the resources. The maximum available bandwidth may indicate the maximum available network bandwidth associated with the user device based on the network environment. The duration of time may be the duration of the user's one or more application sessions associated with the store indicted by StoreName. Bandwidth agent 820 may recalculate the maximum available bandwidth when the duration of time ends. The network quality may be determined based on the maximum available bandwidth. For example, if the maximum available bandwidth is determined to be at or below 100 kbps, the network quality may be determined as poor. On the contrary, if the maximum available bandwidth is determined to be higher than 100 kbps, the network quality may be determined as good.

Referring to FIG. 9B, table B may store a user's application session information. For example, table B may store a user ID, a StoreName, a network ID, running application information or latest application session information, the network bandwidth of the running applications or the latest application session information, and/or the currently available bandwidth. The running application information may comprise the names of the currently running applications and/or a session (e.g., a period of time) during which a user interacts with the applications. The network bandwidth of running applications may indicate the current bandwidth usage rate for each application session (e.g., the bandwidth allocated to each application session). The currently available bandwidth may be determined based on the current bandwidth usage rate for each application session and the maximum available bandwidth. The currently available bandwidth may be used to determine application recommendations.

Referring to FIG. 9C, table C may store a user's application session information. For example, table C may store a user ID, running application information, a network ID, the minimum network bandwidth of the applications, the maximum network bandwidth of the applications, the average network bandwidth of applications, application session use time, and/or network quality.

If the user has not used the application before, the minimum network bandwidth of the application, the maximum network bandwidth of the application, and/or the average network bandwidth of the application may be determined based on other users' usage history. For example, bandwidth information server 860 may obtain crowdsourced user application usage information from a plurality of users (e.g., users from the same company or organization) and may determine the minimum network bandwidth of running application, the maximum network bandwidth of running application, and/or the average network bandwidth of running application.

If the user has used the application before, the minimum network bandwidth of the running application, the maximum network bandwidth of the running application, and/or the average network bandwidth of the running application may be determined based on the user's historical application usage data. The user may select a better network and select a suitable application to launch based on the user's historical application usage data.

Tables A-C may be used by workspace application 810 to dynamically update workspace user interface 870 to provide real-time network bandwidth usage information and application recommendations for the users. For example, workspace application 810 may query bandwidth information server 860 for the data (e.g., historical user application usage data) stored in bandwidth information server 860. Workspace application 810 may receive a response from bandwidth information server 860 indicating the query result and may then update workspace user interface 870 based on the query result. For example, network bandwidth indicator 710 and the recommended applications may be updated based on the query result (e.g., the available network bandwidth stored in Table B).

In addition, bandwidth information server 860 may compare the network bandwidth information (e.g., the average network bandwidth stored in FIG. 9C) associated with each application available to be launched to the currently available network bandwidth of the user device and determine which application may be suggested to be launched. For example, if the average network bandwidth associated with an application available to be launched exceeds the currently available network bandwidth of the user device, bandwidth information server 860 might not recommend launching the application. Bandwidth information server 860 may determine the status of each application if the user selects, launches, closes, or otherwise configures an application. Bandwidth information server 860 may then send the application status to workspace application 810. Workspace application 810 may then update workspace user interface 870 (e.g., visual cue 770) based on the application status.

Figure 10:
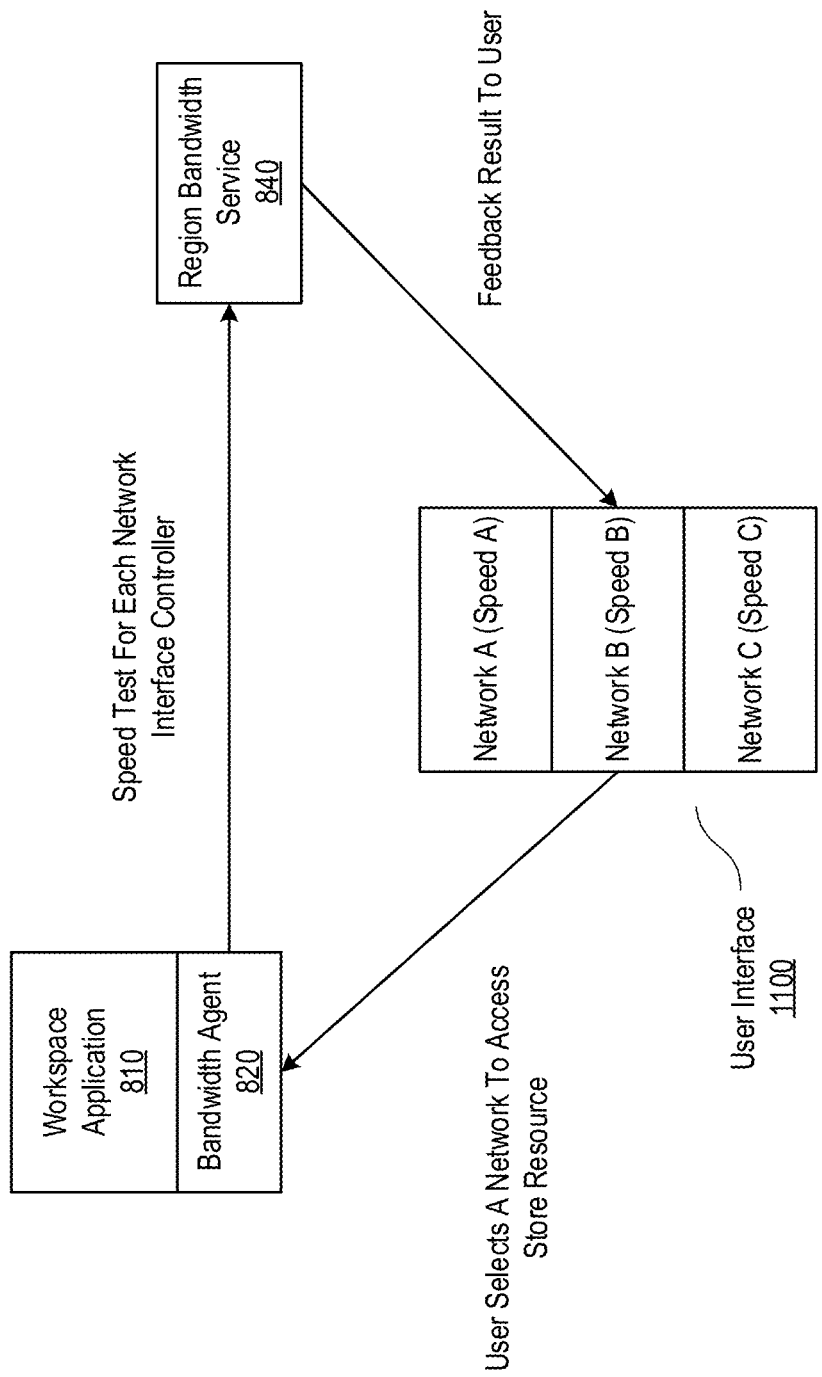
FIG. 10 depicts a schematic diagram showing an example system for providing network recommendation that may be used in accordance with one or more illustrative aspects described herein.

FIG. 10 depicts a schematic diagram showing an example system for network recommendation that may be used in accordance with one or more illustrative aspects described herein. A user may not be aware of available networks for accessing remote resources, so bandwidth agent 820 may monitor the current network status and may provide network recommendations for the user. For example, bandwidth agent 820 may perform a speed test for each network interface controller (e.g., a network interface card) associated with a user device. Each network interface controller may be associated with an available network and may support a certain range of network speed (e.g., a transfer rate of data). The performance of the speed test may be triggered based on a user accessing a resource (e.g., clicking on a store resource URL). The speed test may generate a test result that indicates a network speed associated with each network interface controller. Bandwidth agent 820 may then send the speed test results to region bandwidth service 840.

Region bandwidth service 840 may then provide the speed test results to the user. As shown in FIG. 10, based on the speed test results, one or more available networks (e.g., network A, network B, and network C) may be displayed via a user interface 1110 (e.g., workspace user interface 870) of the user device. Each available network may be associated with a network speed. For example, the user interface may display network A (e.g., a broadband connection) associated with 500 kbps, network B (e.g., a first wireless connection) associated with 90 kbps, and/or network C (e.g., a second wireless connection) associated with 30 kbps, so that the user may be informed of the available networks with associated network speeds. The user may then select (e.g., change from a previous network to a new network) one of the available networks to access resources. For example, the user may select the network with the fastest network speed. The maximum available network bandwidth associated with the user device may be determined based on which network the user selects.

Figure 11:
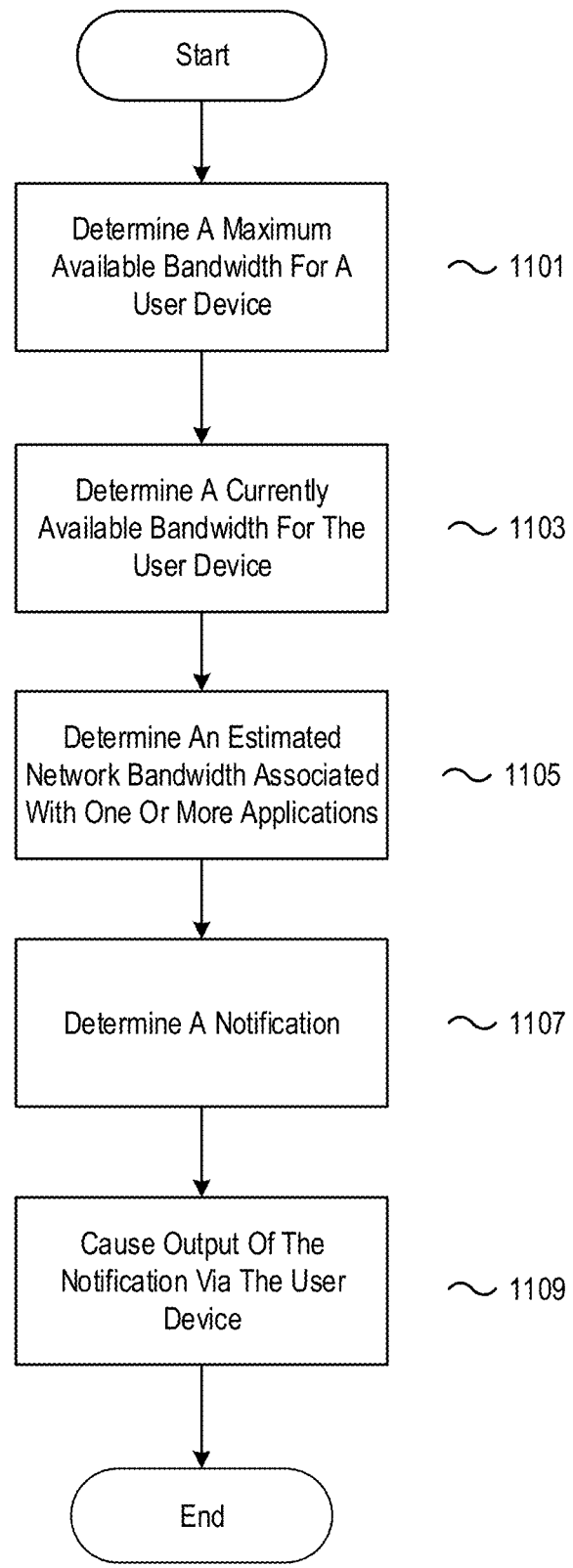
FIG. 11 depicts a flowchart showing an example method for network environment-based dynamic application recommendation in accordance with one or more illustrative aspects described herein.

FIG. 11 depicts a flowchart showing an example method for network environment-based dynamic application recommendation in accordance with one or more illustrative aspects described herein. The example method may be performed, for example, by bandwidth information server 860 or region bandwidth service 840. The steps of the example method are described as being performed by particular computing devices for the sake of simplicity, but the steps may be performed by any other computing device.

At step 1101, a computing device may determine a maximum available bandwidth for a user device (e.g., client 202).

At step 1103, the computing device may determine, based on a network bandwidth associated with one or more applications running on the user device, a currently available bandwidth for the user device.

At step 1105, the computing device may determine an estimated network bandwidth associated with one or more applications available to be launched via the user device. For example, the computing device may determine, based on historical usage data associated with the one or more applications available to be launched, the estimated network bandwidth associated with the one or more applications available to be launched. The computing device or another computing device may store the historical usage data associated with the one or more applications.

At step 1107, the computing device may determine, based on the maximum available bandwidth, the currently available bandwidth for the user device, and the estimated network bandwidth associated with the one or more applications available to be launched, a notification. The notification may comprise information indicating at least one suggested application of the one or more applications available to be launched. Additionally or alternatively, the notification may comprise information indicating that one or more applications that are not suitable to be launched based on the currently available bandwidth for the user device. Example user interfaces for outputting the notification have been described in connection with FIGS. 6-7E.

At step 1100, the computing device may cause the output of the notification. For example, the notification may be output via a user interface (e.g., workspace user interface 870) on the user device.

The following paragraphs (M1) through (M8) describe examples of methods that may be implemented in accordance with the present disclosure.

(M1) A method comprising: determining, by a computing device, a maximum available bandwidth for a user device; determining, based on a network bandwidth associated with one or more applications running on the user device, a currently available bandwidth for the user device; determining an estimated network bandwidth associated with one or more applications available to be launched via the user device; and determining, based on the maximum available bandwidth, the currently available bandwidth for the user device, and the estimated network bandwidth associated with the one or more applications available to be launched, a notification, the notification comprising information indicating at least one suggested application of the one or more applications available to be launched; and causing output of the notification via the user device.

(M2) A method may be performed as described in paragraph (M1) wherein the determining the estimated network bandwidth associated with the one or more applications available to be launched comprises determining, based on historical usage data associated with the one or more applications available to be launched, the estimated network bandwidth associated with the one or more applications available to be launched.

(M3) A method may be performed as described in either paragraph (M1) or (M2) further comprising: causing output of a network bandwidth bar that indicates a progress of bandwidth usage associated with the one or more applications running on the user device.

(M4) A method may be performed as described in any of paragraphs (M1) through (M3) further comprising: receiving a selection of launching one of the one or more applications available to be launched; and updating the currently available bandwidth for the user device.

(M5) A method may be performed as described in any of paragraphs (M1) through (M4) further comprising: receiving an indication of a potential selection of one of the one or more applications available to be launched; determining a total network bandwidth of the one or more applications running on the user device and the one of the one or more applications available to be launched; and based on a determination that the total network bandwidth exceeds the maximum available bandwidth, causing output of another notification indicating a network warning.

(M6) A method may be performed as described in any of paragraphs (M1) through (M5) further comprising: causing output of a user interface on the user device, the user interface comprising information indicating the network bandwidth associated with each of the one or more applications running on the user device and the estimated network bandwidth associated with each of the one or more applications available to be launched.

(M7) A method may be performed as described in any of paragraphs (M1) through (M6), wherein the notification further comprises a recommendation for closing at least one of the one or more applications running on the user device.

(M8) A method may be performed as described in any of paragraphs (M1) through (M7) wherein the determining the notification further comprises comparing the maximum available bandwidth with a total of (a) the network bandwidth associated with the one or more applications running on the user device and (b) the estimated network bandwidth associated with the one or more applications available to be launched.

The following paragraphs (A1) through (A8) describe examples of apparatuses that may be implemented in accordance with the present disclosure.

(A1) An apparatus comprising one or more processors; and memory storing instructions that, when executed by the one or more processors, cause the apparatus to determine a maximum available bandwidth for a user device; determine, based on a network bandwidth associated with one or more applications running on the user device, a currently available bandwidth for the user device; determine an estimated network bandwidth associated with one or more applications available to be launched via the user device; and determine, based on the maximum available bandwidth, the currently available bandwidth for the user device, and the estimated network bandwidth associated with the one or more applications available to be launched, a notification, the notification comprising information indicating at least one suggested application of the one or more applications available to be launched; and cause output of the notification via the user device.

(A2) An apparatus may be implemented as described in paragraph (A1) wherein the instructions, when executed by the one or more processors, further cause the apparatus to determine, based on historical usage data associated with the one or more applications available to be launched, the estimated network bandwidth associated with the one or more applications available to be launched.

(A3) An apparatus may be implemented as described in paragraph (A1) or paragraph (A2) wherein the instructions, when executed by the one or more processors, further cause the apparatus to cause output of a network bandwidth bar that indicates a progress of bandwidth usage associated with the one or more applications running on the user device.

(A4) An apparatus may be implemented as described in any of paragraphs (A1) through (A3) wherein the instructions, when executed by the one or more processors, further cause the apparatus to receive a selection of launching one of the one or more applications available to be launched; and update the currently available bandwidth for the user device.

(A5) An apparatus may be implemented as described in any of paragraphs (A1) through (A4) wherein the instructions, when executed by the one or more processors, further cause the apparatus to receive an indication of a potential selection of one of the one or more applications available to be launched; determine a total network bandwidth of the one or more applications running on the user device and the one of the one or more applications available to be launched; and based on a determination that the total network bandwidth exceeds the maximum available bandwidth, causing output of another notification indicating a network warning.

(A6) An apparatus may be implemented as described in any of paragraphs (A1) through (A5) wherein the instructions, when executed by the one or more processors, further cause the apparatus to cause output of a user interface on the user device, the user interface comprising information indicating the network bandwidth associated with each of the one or more applications running on the user device and the estimated network bandwidth associated with each of the one or more applications available to be launched.

(A7) An apparatus may be implemented as described in any of paragraphs (A1) through (A6) wherein the notification further comprises a recommendation for closing at least one of the one or more applications running on the user device.

(A8) An apparatus may be implemented as described in any of paragraphs (A1) through (A7) wherein the instructions, when executed by the one or more processors, further cause the apparatus to compare the maximum available bandwidth with a total of (a) the network bandwidth associated with the one or more applications running on the user device and (b) the estimated network bandwidth associated with the one or more applications available to be launched.

The following paragraphs (CRM1) through (CRM4) describe examples of computer-readable media that may be implemented in accordance with the present disclosure.

(CRM1) A non-transitory computer-readable medium storing instructions that, when executed, cause: determining a maximum available bandwidth for a user device; determining, based on a network bandwidth associated with one or more applications running on the user device, a currently available bandwidth for the user device; determining an estimated network bandwidth associated with one or more applications available to be launched via the user device; and determining, based on the maximum available bandwidth, the currently available bandwidth for the user device, and the estimated network bandwidth associated with the one or more applications available to be launched, a notification, the notification comprising information indicating at least one suggested application of the one or more applications available to be launched; and causing output of the notification via the user device.

(CRM2) A non-transitory computer-readable medium may be implemented as described in paragraph (CRM1) wherein the instructions, when executed, further cause: determining, based on historical usage data associated with the one or more applications available to be launched, the estimated network bandwidth associated with the one or more applications available to be launched.

(CRM3) A non-transitory computer-readable medium may be implemented as described in paragraph (CRM2) wherein the instructions, when executed, further cause: causing output of a network bandwidth bar that indicates a progress of bandwidth usage associated with the one or more applications running on the user device.

(CRM4) A non-transitory computer-readable medium may be implemented as described in any of paragraphs (CRM1) through (CRM4) wherein the instructions, when executed, further cause: receiving a selection of launching one of the one or more applications available to be launched; and updating the currently available bandwidth for the user device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a computing device, a maximum available bandwidth for a user device;
   determining, based on a network bandwidth associated with one or more applications running on the user device, a currently available bandwidth for the user device;
   determining an estimated network bandwidth associated with one or more applications available to be launched via the user device;
   determining, based on the maximum available bandwidth, the currently available bandwidth for the user device, and the estimated network bandwidth associated with the one or more applications available to be launched, at least one application of the one or more applications available to be launched that is suggested to not be launched and at least one suggested application of the one or more applications available to be launched; and
   providing a user interface, the user interface comprising information displaying:
      the one or more applications running on the user device and a network bandwidth associated with each of the one or more applications running on the user device,
      the at least one application suggested to not be launched and the estimated network bandwidth associated with each of the at least one application suggested to not be launched, and
      the at least one suggested application of the one or more applications available to be launched.

2. The method of claim 1, wherein the determining the estimated network bandwidth associated with the one or more applications available to be launched comprises determining, based on historical usage data associated with the one or more applications available to be launched, the estimated network bandwidth associated with the one or more applications available to be launched.

3. The method of claim 1, further comprising:
   causing output of a network bandwidth bar that indicates a progress of bandwidth usage associated with the one or more applications running on the user device.

4. The method of claim 1, further comprising:
   receiving a selection of launching one of the one or more applications available to be launched; and
   updating the currently available bandwidth for the user device.

5. The method of claim 1, further comprising:
   receiving an indication of a potential selection of one of the one or more applications available to be launched;
   determining a total network bandwidth of the one or more applications running on the user device and the one of the one or more applications available to be launched; and
   based on a determination that the total network bandwidth exceeds the maximum available bandwidth, causing output of a notification indicating a network warning.

6. The method of claim 1, wherein the user interface further comprises a recommendation for closing at least one of the one or more applications running on the user device.

7. The method of claim 1, further comprising:
   comparing the maximum available bandwidth with a total of (a) the network bandwidth associated with the one or more applications running on the user device and (b) the estimated network bandwidth associated with the one or more applications available to be launched.

8. An apparatus comprising:
   one or more processors; and
   memory storing instructions that, when executed by the one or more processors, cause the apparatus to:
      determine a maximum available bandwidth for a user device;
      determine, based on a network bandwidth associated with one or more applications running on the user device, a currently available bandwidth for the user device;
      determine an estimated network bandwidth associated with one or more applications available to be launched via the user device;
      determine, based on the maximum available bandwidth, the currently available bandwidth for the user device, and the estimated network bandwidth associated with the one or more applications available to be launched, at least one application of the one or more applications available to be launched that is suggested to not be launched, and at least one suggested application of the one or more applications available to be launched; and
      provide a user interface, the user interface comprising information displaying:
         the one or more applications running on the user device and a network bandwidth associated with each of the one or more applications running on the user device,
         the at least one application suggested to not be launched and the estimated network bandwidth associated with each of the at least one application suggested to not be launched, and
         the at least one suggested application of the one or more applications available to be launched.

9. The apparatus of claim 8, wherein the instructions, when executed by the one or more processors, further cause the apparatus to
   determine, based on historical usage data associated with the one or more applications available to be launched, the estimated network bandwidth associated with the one or more applications available to be launched.

10. The apparatus of claim 8, wherein the instructions, when executed by the one or more processors, further cause the apparatus to
    cause output of a network bandwidth bar that indicates a progress of bandwidth usage associated with the one or more applications running on the user device.

11. The apparatus of claim 8, wherein the instructions, when executed by the one or more processors, further cause the apparatus to
    receive a selection of launching one of the one or more applications available to be launched; and
    update the currently available bandwidth for the user device.

12. The apparatus of claim 8, wherein the instructions, when executed by the one or more processors, further cause the apparatus to
    receive an indication of a potential selection of one of the one or more applications available to be launched;

determine a total network bandwidth of the one or more applications running on the user device and the one of the one or more applications available to be launched; and based on a determination that the total network bandwidth exceeds the maximum available bandwidth, causing output of a notification indicating a network warning.

13. The apparatus of claim 8, wherein the user interface further comprises a recommendation for closing at least one of the one or more applications running on the user device.

14. The apparatus of claim 8, wherein the instructions, when executed by the one or more processors, further cause the apparatus to compare the maximum available bandwidth with a total of (a) the network bandwidth associated with the one or more applications running on the user device and (b) the estimated network bandwidth associated with the one or more applications available to be launched.

15. One or more non-transitory computer readable media storing computer readable instructions that, when executed, cause:

determining a maximum available bandwidth for a user device;

determining, based on a network bandwidth associated with one or more applications running on the user device, a currently available bandwidth for the user device;

determining an estimated network bandwidth associated with one or more applications available to be launched via the user device;

determining, based on the maximum available bandwidth, the currently available bandwidth for the user device, and the estimated network bandwidth associated with the one or more applications available to be launched, at least one application of the one or more applications available to be launched that is suggested to not be launched, and at least one suggested application of the one or more applications available to be launched; and providing a user interface, the user interface comprising information displaying:

the one or more applications running on the user device and a network bandwidth associated with each of the one or more applications running on the user device, the at least one application suggested to not be launched and the estimated network bandwidth associated with each of the at least one application suggested to not be launched, and the at least one suggested application of the one or more applications available to be launched.

16. The one or more non-transitory computer readable media of claim 15, wherein the instructions, when executed, further cause:

determining, based on historical usage data associated with the one or more applications available to be launched, the estimated network bandwidth associated with the one or more applications available to be launched.

17. The one or more non-transitory computer readable media of claim 15, wherein the instructions, when executed, further cause:

causing output of a network bandwidth bar that indicates a progress of bandwidth usage associated with the one or more applications running on the user device.

18. The one or more non-transitory computer readable media of claim 15, wherein the instructions, when executed, further cause:

receiving a selection of launching one of the one or more applications available to be launched; and updating the currently available bandwidth for the user device.

19. The one or more non-transitory computer readable media of claim 15, wherein the instructions, when executed, further cause:

receiving an indication of a potential selection of one of the one or more applications available to be launched;

determining a total network bandwidth of the one or more applications running on the user device and the one of the one or more applications available to be launched; and based on a determination that the total network bandwidth exceeds the maximum available bandwidth, causing output of a notification indicating a network warning.

20. The one or more non-transitory computer readable media of claim 15, wherein the user interface further comprises a recommendation for closing at least one of the one or more applications running on the user device.

* * * * *